US012084197B2

(12) United States Patent
Cabos et al.

(10) Patent No.: US 12,084,197 B2
(45) Date of Patent: *Sep. 10, 2024

(54) FOREIGN OBJECT DETECTION FOR VEHICLE OPERATION, PRODUCTION, AND MAINTENANCE

(71) Applicant: The Boeing Company, Chicago, IL (US)

(72) Inventors: Ralf Rene Cabos, Hainburg (DE); Nils Kneuper, Gravenbruch (DE); Jennifer Mayer, Hasselroth (DE)

(73) Assignee: The Boeing Company, Arlington, VA (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/452,910

(22) Filed: Oct. 29, 2021

(65) Prior Publication Data

US 2022/0063834 A1 Mar. 3, 2022

Related U.S. Application Data

(63) Continuation-in-part of application No. 17/443,360, filed on Jul. 26, 2021, now Pat. No. 11,858,653, (Continued)

(51) Int. Cl.
*B64D 45/00* (2006.01)
*B64D 11/00* (2006.01)
(Continued)

(52) U.S. Cl.
CPC .......... *B64D 45/00* (2013.01); *B64D 11/0015* (2013.01); *B64D 11/003* (2013.01);
(Continued)

(58) Field of Classification Search
CPC ...... B60W 50/14; B60W 30/08; B60W 30/10; B60W 2420/403; B60W 2520/28;
(Continued)

(56) References Cited

U.S. PATENT DOCUMENTS

2012/0140041 A1* 6/2012 Burgunder ............. G01B 11/24
348/46
2013/0194089 A1* 8/2013 Estrada .................. G08B 21/22
340/584

(Continued)

FOREIGN PATENT DOCUMENTS

WO WO-2018077467 A1 * 5/2018 ............. B60N 2/002

*Primary Examiner* — Quan Zhen Wang
*Assistant Examiner* — Rajsheed O Black-Childress
(74) *Attorney, Agent, or Firm* — Alleman Hall & Tuttle LLP

(57) ABSTRACT

Systems and methods relating to foreign object detection with respect to stowage compartments or other regions of a vehicle are provided. According to one example, sensor data is captured via a sensor subsystem that includes a sensor associated with each of a plurality of stowage compartments. For each of the stowage compartments, a baseline condition is identified in which foreign objects are absent from the stowage compartment. A foreign object is detected within a stowage compartment based on the sensor data received for the stowage compartment and the baseline condition identified for the stowage compartment. An indication that the foreign object is detected within the stowage compartment is output. This indication may identify the stowage compartment containing the foreign object among the plurality of stowage compartments.

20 Claims, 18 Drawing Sheets

Related U.S. Application Data which is a continuation of application No. 16/735,480, filed on Jan. 6, 2020, now Pat. No. 11,072,436.

(51) Int. Cl.

| | | |
|---|---|---|
| *B64D 11/06* | (2006.01) | |
| *B64D 47/02* | (2006.01) | |
| *G06V 20/52* | (2022.01) | |
| *H04L 67/12* | (2022.01) | |

(52) U.S. Cl.
CPC ......... *B64D 11/0636* (2014.12); *B64D 47/02* (2013.01); *G06V 20/52* (2022.01); *H04L 67/12* (2013.01); *B64D 2045/009* (2013.01)

(58) Field of Classification Search
CPC ......... B60W 2552/45; B60W 2556/50; B60W 2756/10; B60W 30/02; B60W 2422/40; B60W 2510/22; B60W 2540/18; B60W 40/064; B60W 40/06; B60T 7/22; B60T 2201/083; B60T 8/17557; B60T 8/32; G06V 20/588

See application file for complete search history.

(56) References Cited

U.S. PATENT DOCUMENTS

| | | | |
|---|---|---|---|
| 2017/0283086 A1* | 10/2017 | Garing | B64D 11/0638 |
| 2018/0257784 A1 | 9/2018 | Simms et al. | |
| 2018/0261026 A1 | 9/2018 | Simms et al. | |
| 2019/0251376 A1* | 8/2019 | Stoffel | B60Q 3/76 |
| 2019/0318164 A1 | 10/2019 | Kumar et al. | |
| 2020/0047639 A1* | 2/2020 | Schevardo | B60N 2/002 |
| 2020/0407047 A1* | 12/2020 | Kerr | B64C 9/00 |
| 2021/0016894 A1 | 1/2021 | Childress | |
| 2022/0065631 A1* | 3/2022 | Lee | G16Y 40/60 |

\* cited by examiner

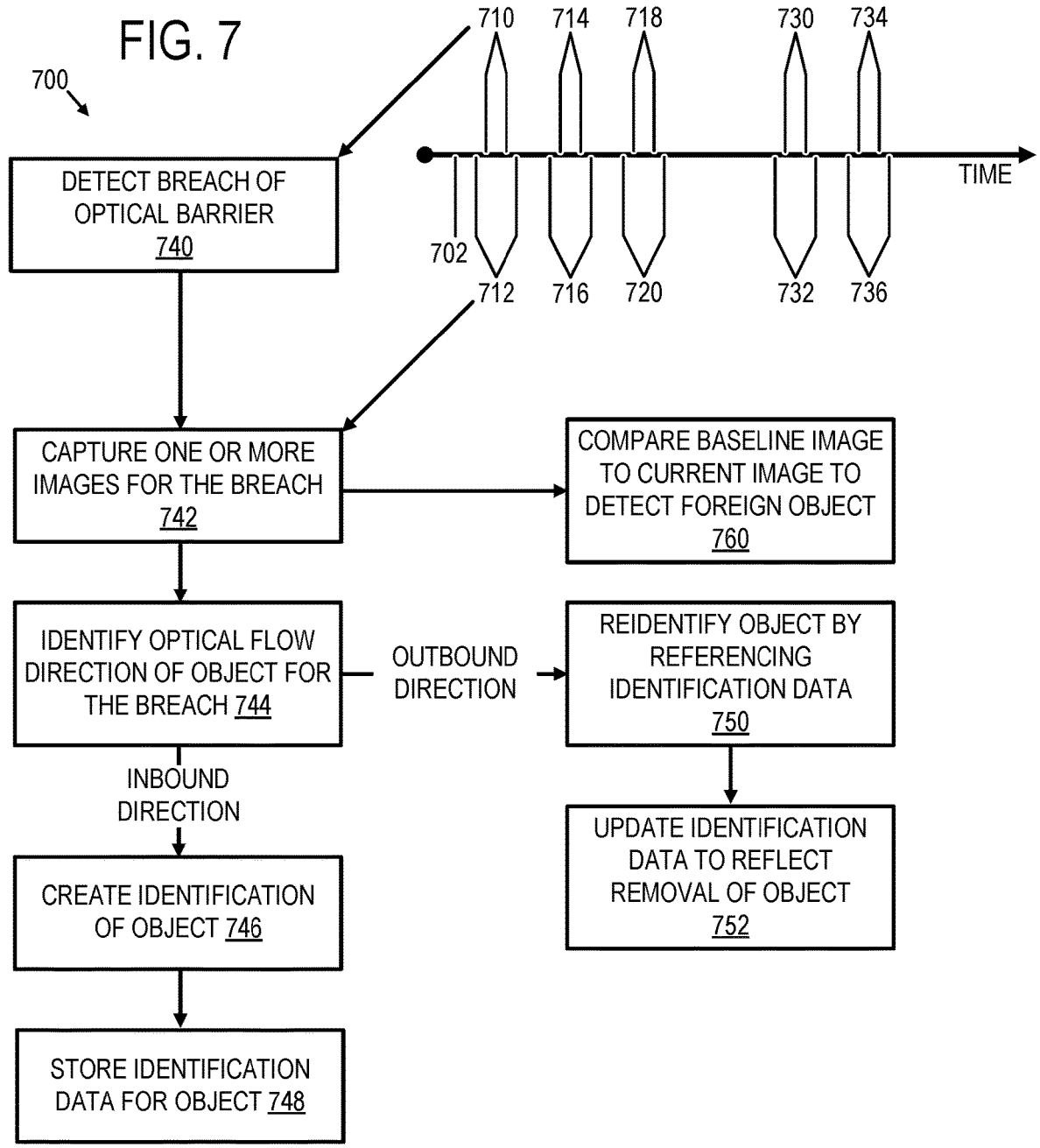

| SEAT ID | SEATBACK POCKET ID | SEATBACK POCKET SENSOR DATA | FOREIGN OBJECT CONDITION ID | OTHER OPERATING CONDITIONS | ... | OVERHEAD BIN ID | OVERHEAD BIN SENSOR DATA | FOREIGN OBJECT CONDITION ID | OTHER OPERATING CONDITIONS |
|---|---|---|---|---|---|---|---|---|---|
| 1A | SBP1 | A, B, C, D | 0 | 0 | | OHB1 | E, F, G, H | 0 | 0 |
| 1B | SBP2 | A, B, C, D | 0 | 0 | | OHB1 | E, F, G, H | 0 | 0 |
| 1C | SBP3 | A, B, C, D | 0 | 0 | | OHB1 | E, F, G, H | 0 | 0 |
| 2A | SBP4 | A, B, C, D | 0 | 0 | | OHB1 | E, F, G, H | 0 | 0 |
| 2B | SBP5 | A, B, C, D | 0 | 0 | | OHB1 | E, F, G, H | 0 | 0 |
| 2C | SBP6 | A, B, C, D | 0 | 0 | | OHB2 | E, F, G, H | 0 | 0 |
| 3A | SBP7 | A, B, C, D | 0 | 0 | | OHB2 | E, F, G, H | 0 | 0 |
| 3B | SBP8 | A, B, C, D | 0 | 0 | | OHB2 | E, F, G, H | 0 | 0 |
| 3C | SBP9 | | | | | | | | |
| ... | | | | | | | | | |
| N | SBPN | A, B, C, D | 0 | 0 | | OHBN | E, F, G, H | 0 | 0 |

FIG. 8A

| CABINET ID | CABINET SENSOR DATA | FOREIGN OBJECT CONDITION ID | OTHER OPERATING CONDITIONS |
|---|---|---|---|
| C1 | I, J, K, L | 0 | 0 |
| C2 | I, J, K, L | 0 | 0 |
| C3 | I, J, K, L | 0 | 0 |
| C4 | I, J, K, L | 0 | 0 |
| ... | | | |
| CN | I, J, K, L | 0 | 0 |

| CARGO HOLD ID | CARGO HOLD SENSOR DATA | FOREIGN OBJECT CONDITION ID | OTHER OPERATING CONDITIONS |
|---|---|---|---|
| CH1 | M, N, O, P | 0 | 0 |
| CH2 | M, N, O, P | 0 | 0 |
| CH3 | M, N, O, P | 0 | 0 |
| CH4 | M, N, O, P | 0 | 0 |
| ... | | | |
| CHN | M, N, O, P | 0 | 0 |

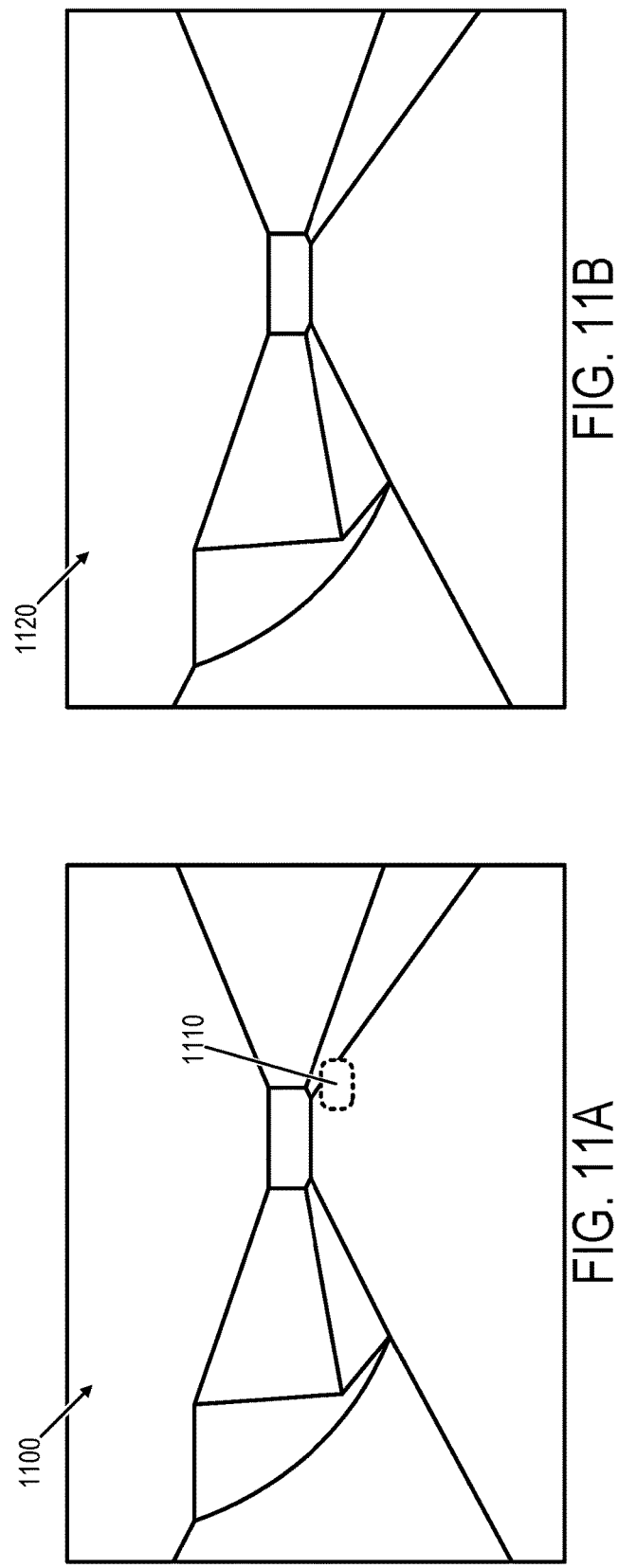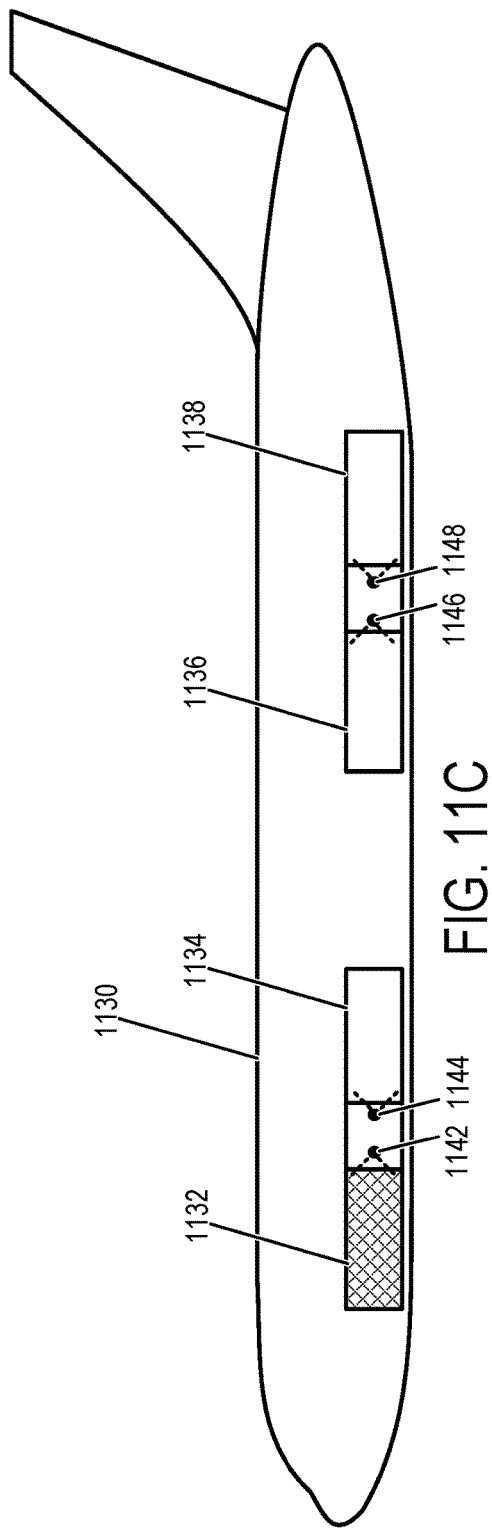

FOREIGN OBJECT DETECTION FOR VEHICLE OPERATION, PRODUCTION, AND MAINTENANCE

CROSS REFERENCE TO RELATED APPLICATIONS

This application is a continuation-in-part of U.S. patent application Ser. No. 17/443,360, filed Jul. 26, 2021, which is a continuation of U.S. patent application Ser. No. 16/735,480, filed Jan. 6, 2020, and issued as U.S. Pat. No. 11,072,436, the entirety of which are hereby incorporated herein by reference for all purposes.

FIELD

An invention of the present disclosure relates generally to detecting the presence of foreign objects within vehicles or vehicle components during operation, production, or maintenance.

BACKGROUND

Passenger vehicles, including passenger aircraft typically include passenger-accessible stowage compartments in the form of overhead bins and seatback pockets for passengers to store their personal belongings during operation of the vehicle. Service personnel, such as members of a flight crew of an aircraft may also utilize stowage compartments during operation of the vehicle. Passengers or service personnel may exit the vehicle at the conclusion of vehicle operation, and unintentionally leave their personal belongings in a stowage compartment on-board the vehicle. Between aircraft flights, as an example, service personnel may be tasked with checking stowage compartments for passenger belongings or to determine whether service items need to be restocked, such as magazines, menus, blankets, pillows, bottled water, etc. Foreign objects, such as cargo may be unintentionally left by service personnel within a cargo hold of a vehicle while unloading or cleaning the cargo hold.

Production and maintenance of vehicles, such as aircraft for example, can involve production or maintenance personnel inadvertently leaving foreign objects such as tools, parts, materials, or personal items on-board the vehicle or within vehicle components to be assembled. Some regions of the vehicle may be inaccessible following production or maintenance, making it difficult for personnel to confirm that foreign objects are not present on-board the vehicle prior to or during operation.

SUMMARY

Systems and methods relating to foreign object detection with respect to operation, production, and maintenance of a vehicle are disclosed. According to an example of foreign object detection for a vehicle (e.g., an aircraft), sensor data is received that was captured via a sensor subsystem that includes a sensor associated with a stowage compartment of the vehicle. Examples of stowage compartments include overhead bins, seatback pockets, cabinets, and cargo holds of the vehicle. A baseline condition is identified for the stowage compartment in which foreign objects are absent from the stowage compartment. A foreign object is detected within the stowage compartment based on the received sensor data for the stowage compartment and the baseline condition identified for the stowage compartment. An indication that the foreign object is within the stowage compartment is output responsive to detection of the foreign object.

According to another example of foreign object detection for a vehicle, image data for a region of a vehicle (e.g., an aircraft) or a vehicle component captured via one or more cameras is obtained by a computing system. Baseline image data for the region of the vehicle or the vehicle component is obtained by the computing system. The computing system detects a foreign object within the image data for the region of the vehicle or the vehicle component based on a comparison of the image data and the baseline image data. An indication that the foreign object is present within the image data is output by the computing system responsive to detecting the foreign object.

BRIEF DESCRIPTION OF THE DRAWINGS

FIG. 7 depicts an example timeline and flow diagram in which operations of the method of FIGS. 5A and 5B are performed with respect to an overhead bin, cabinet, or cargo hold.

FIGS. 8A, 8B, and 8C depict tables describing example data associations that can be maintained for a detection system.

FIG. 11A depicts an example field of view of a camera of an imaging system positioned within a cargo hold of a vehicle, such as an aircraft.

FIG. 11B depicts another example field of view of a camera of an imaging system positioned within the cargo hold of the vehicle of FIG. 11A.

FIG. 11C depicts a simplified representation of a vehicle in the form of an aircraft.

DETAILED DESCRIPTION

Figure 1A:
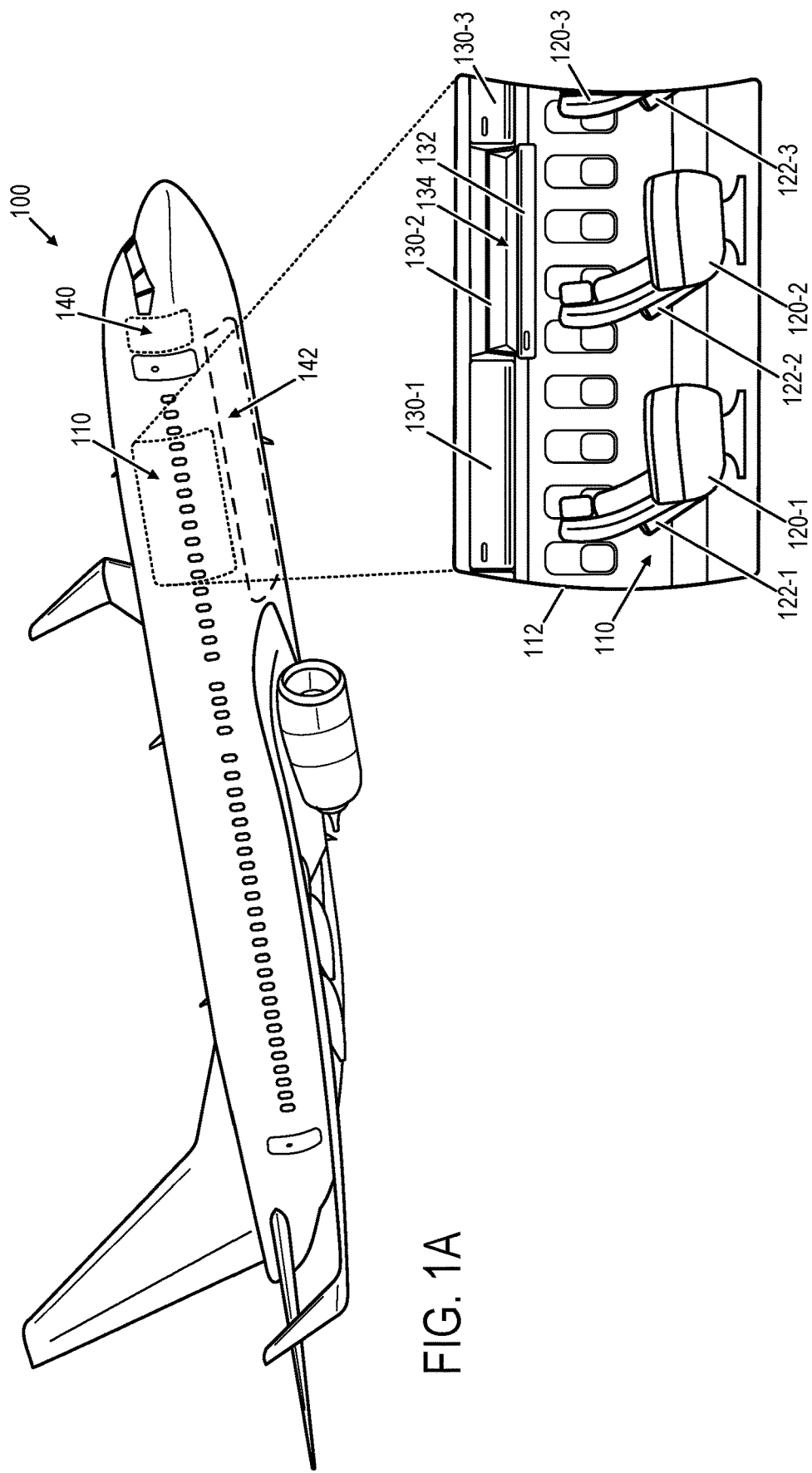
FIG. 1A depicts an example vehicle in the form of a passenger aircraft.

Sensor-based detection of foreign objects stowed within stowage compartments of a vehicle has the potential to reduce the occurrence of passengers or service personnel unintentionally abandoning personal belongings at the conclusion of service, and can also reduce the burden on service personnel inspecting the stowage compartments between service events. Furthermore, sensor-based detection of foreign objects as part of production and maintenance of a vehicle has the potential to reduce the occurrence of foreign objects remaining on-board the vehicle, and can also reduce the burden on production and maintenance personnel inspecting the vehicle for foreign objects prior to operation of the vehicle.

In accordance with one example of the present disclosure, sensor data is captured via a sensor subsystem that includes at least one sensor associated with each of a plurality of stowage compartments of a vehicle. Examples of stowage compartments include overhead bins, seatback pockets, storage cabinets for service personnel, and cargo holds.

A foreign object can be detected within a stowage compartment based on sensor data received for the stowage compartment and a baseline condition identified for the stowage compartment. An indication that the foreign object is detected within the stowage compartment can be output to a user interface. The indication can identify the stowage compartment containing the foreign object among the plurality of stowage compartments, and can be directed to personnel or to a passenger associated with a particular seat of the vehicle. Additional conditions can be detected via stowage compartment sensors, including the removal of service objects from the stowage compartment, fire or smoke conditions, and fatigue of components.

By outputting an indication of these conditions, passengers or personnel can be reminded at an appropriate time that personal belongings remain within a stowage compartment. Furthermore, the indication can enable personnel to check fewer stowage compartments, for example, by attending only to those stowage compartments for which a condition has been detected.

In at least some examples, an audit of the stowage compartments for foreign objects can be conducted responsive to an audit condition, which can include a user input or a sensor input from a sensor located on-board the vehicle.

The techniques and configurations disclosed herein have the potential to address several challenges associated with detecting foreign objects through the use of sensors. As one example, items belonging to passengers or personnel can have a wide range of physical attributes, including size, shape, weight, density, rigidity, and compressibility. Illustrative examples of this range of items include personal electronic devices, tools, maintenance or production components, books and magazines, articles of clothing, wallets, luggage, and food and beverage items that may be consumed during service.

Additional challenges associated with foreign object detection may be due to the differences in the shape, size, use, and construction of stowage compartments. For example, seatback pockets typically provide a relatively narrow, yet expandable stowage region. Overhead bins and storage cabinets, by contrast, typically feature a rigid construction and offer substantially greater storage capacity as compared to seatback pockets. Cargo holds, as another example, are typically large regions of the vehicle that can be inaccessible to passengers and service personnel during operation of the vehicle.

Furthermore, stowage compartments can be configured for individual use or can be shared among multiple people. For example, overhead bins can be shared by several people, whereas seatback pockets are typically used by an individual person. Cargo holds can be used as stowage for many objects on-board the vehicle, including cargo or luggage of tens or even hundreds of people.

To address the above challenges, a sensor subsystem that includes a variety different sensor configurations for seatback pockets, overhead bins, storage cabinets, and cargo holds is provided. Example sensors include weight sensors, pressure sensors, torque sensors, angle sensors, strain sensors, and optical sensors. In at least some examples, sensor data received from multiple types of sensors per stowage compartment can be combined with sensor fusion to improve detection across a wide range of foreign objects.

FIG. 1A depicts an example vehicle in the form of an aircraft 100. In this example, aircraft 100 takes the form of a passenger aircraft. A portion 112 of a passenger cabin 110 of aircraft 100 is shown in further detail in FIG. 1A. It will be understood that aircraft 100 is merely one example of an aircraft, and that an aircraft may take various forms. Furthermore, while foreign object detection is discussed with respect to stowage compartments or other regions of a passenger aircraft, it will be understood that the techniques and configurations disclosed herein can be incorporated with or used with respect to other types of vehicles, including passenger vehicles and non-passenger (e.g., cargo) vehicles, such as aircraft, trains, buses, watercraft, spacecraft, etc.

Figure 9A:
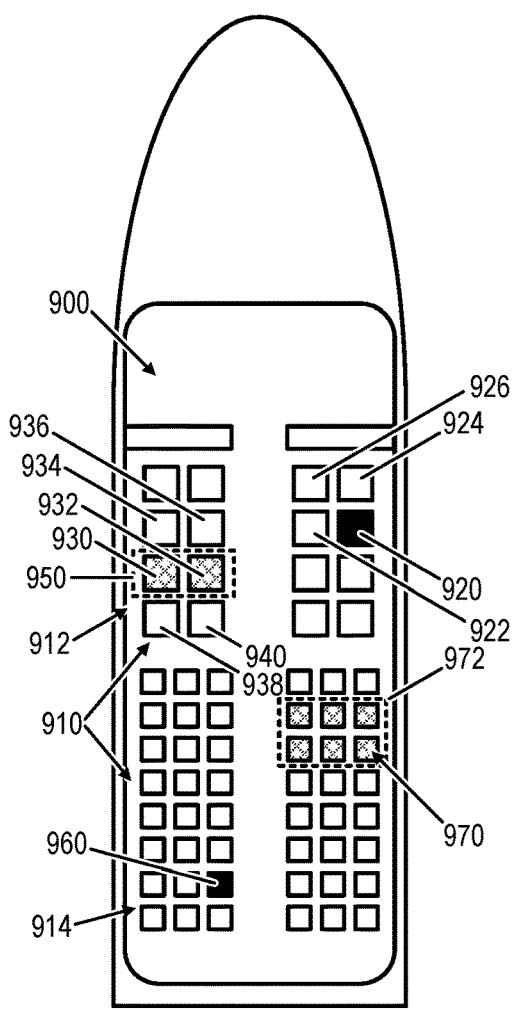
FIGS. 9A, 9B, 9C depict illustrations of an example passenger cabin of a vehicle in the form of an aircraft.
Figure 9B:
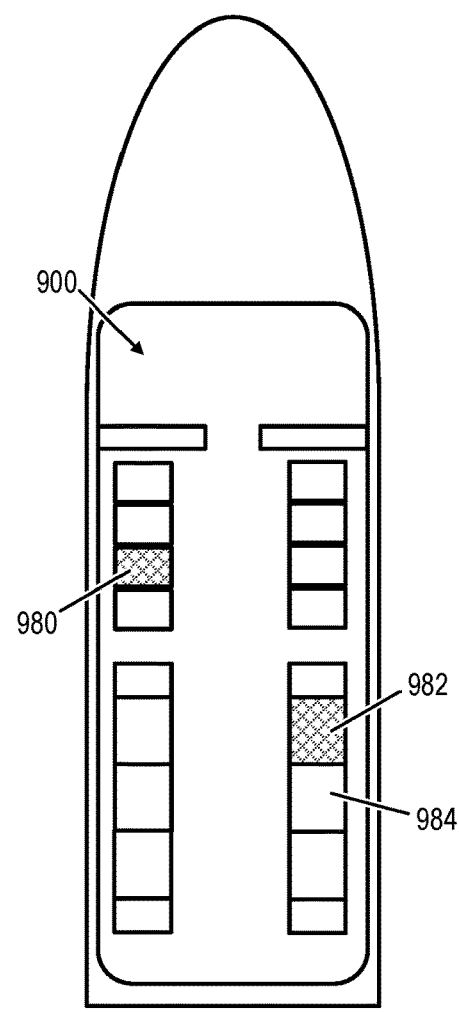
Figure 9C:
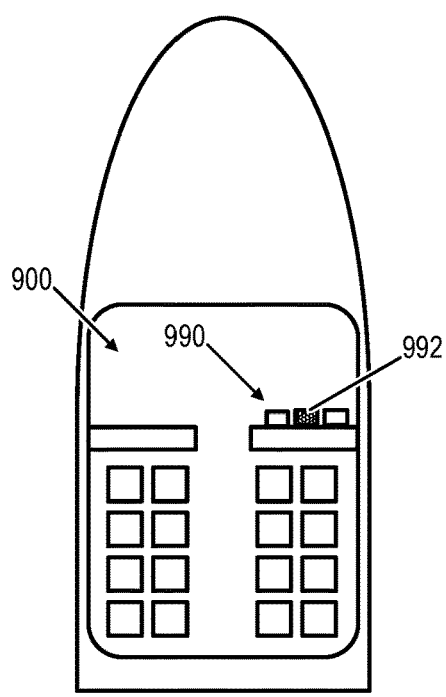

Passenger cabin 110 includes a plurality of passenger seats 120-1, 120-2, 120-3, etc. Depending on vehicle capacity, passenger cabin 110 can include several passenger seats, dozens of passenger seats, hundreds of passenger seats, etc. Passenger seats of passenger cabin 110 can be arranged in rows in at least some examples, such as depicted in FIGS. 9A-9C Each passenger seat can include a seatback pocket, as depicted, for example, at 122-1 for passenger seat 120-1, 122-2 for passenger seat 120-2, and 122-3 for passenger seat 122-3, etc. For passenger seats facing a wall, a pocket similar to a seatback pocket can be mounted to the wall. These wall-mounted pockets may also be referred to herein as a seatback pocket for purposes of the present disclosure.

Passenger cabin 110 includes a plurality of overhead bins 130-1, 130-2, 130-3, etc. As described with reference to example overhead bin 130-2, each overhead bin can include a door 132 that opens to provide access to a stowage region 134 of the overhead bin. Door 132 may be closed to secure contents within the interior of the overhead bin during service. For example, overhead bin 130-2 is depicted in an open configuration, while overhead bins 130-1 and 130-3 are depicted in a closed configuration. While FIG. 1A depicts an example in which each row of passenger seats is associated with a respective overhead bin, in at least some examples an overhead bin may span two or more rows of passenger seats. Thus, two, four, six, or more passenger seats may reside beneath each overhead bin, depending on the configuration of the passenger cabin. Examples of overhead bin configurations are depicted in further detail with respect to FIGS. 9A and 9B. Furthermore, it will be understood that overhead bins can be used by service personnel on-board the vehicle (e.g., flight crew) to store personal belongings during operation of the vehicle.

Aircraft 100 can include one or more service personnel regions, an example of which is depicted as service personnel region 140. In this example, service personnel region 140 is located at an end of passenger cabin 110. However, a service personnel region can be located at other regions of a vehicle. Service personnel region 140 can include stowage compartments such as storage cabinets, overhead bins, and seatback pockets for use by service personnel. Stowage compartments of service personnel region 140 are typically restricted for use by service personnel and are inaccessible or unavailable for use by passengers. An example of service personnel region 140 is described in further detail with reference to FIG. 4B.

Aircraft 100 can include one or more cargo holds, an example of which is depicted as cargo hold 142. In this example, cargo hold 142 is located beneath passenger cabin 110. Cargo holds are typically inaccessible to passengers, and can be inaccessible to service personnel during operation of the vehicle. An example of cargo hold 142 is described in further detail with reference to FIGS. 11A, 11B, and 11C. In at least some examples, passenger cabin 110 can instead be configured for cargo stowage, such as in the context of cargo or freight vehicles. In this configuration, passenger seats and/or overhead bins may be omitted.

Figure 1B:
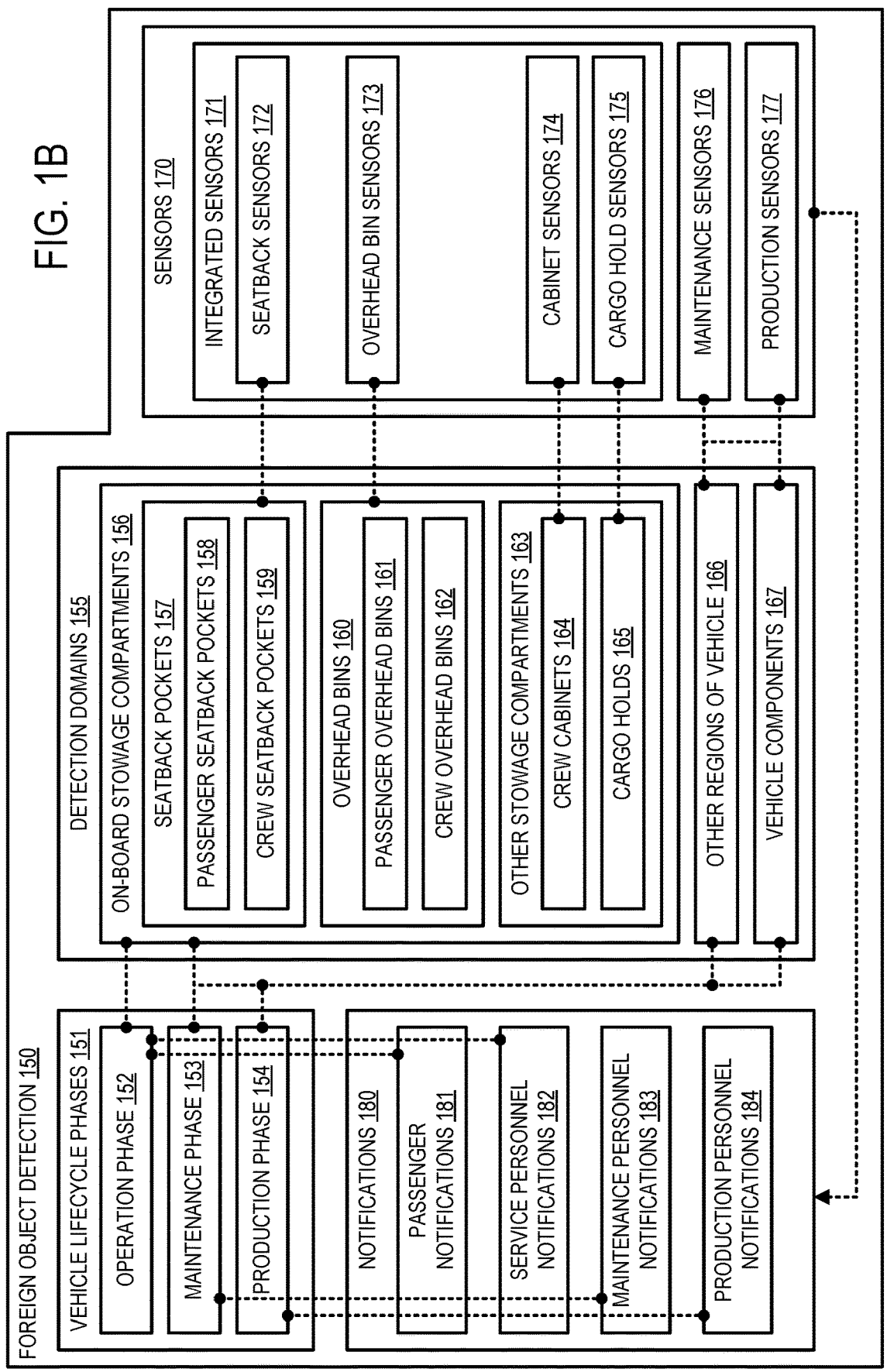
FIG. 1B schematically depicts example features of foreign object detection according to the present disclosure.

FIG. 1B schematically depicts example features of foreign object detection 150 according to the present disclosure. Foreign object detection 150 can be performed with respect to one or more lifecycle phases 151 of a vehicle, including an operation phase 152, a maintenance phase 153, and a production phase 154. Aircraft 100 of FIG. 1A is an example vehicle for which foreign object detection 150 can be performed. However, foreign object detection 150 can be performed with respect to other types of vehicles, including passenger and non-passenger vehicles.

Each of lifecycle phases 151 can be associated with one or more detection domains 155. Examples of detection domains 155 include on-board stowage compartments 156 such as seatback pockets 157 (e.g., passenger seatback pockets 158 and crew seatback pockets 159), overhead bins 160 (e.g., passenger overhead bins 161 and crew overhead bins 162), and other stowage compartments 163, including crew cabinets 164 and cargo holds 165. Stowage compartments 158 and 161 are examples of passenger-designated stowage compartments. Stowage compartments 159, 162, 164, and 165 are examples of service personnel-designated stowage compartments. Other examples of detection domains 155 include other regions of the vehicle 166 (e.g., regions that are inaccessible during operation phase 152) and vehicle components 167 that are assembled as part of maintenance phase 153 or production phase 154.

As an example, operation phase 152 can involve detection domains that include on-board stowage compartments 156, including passenger seatback pockets 158 and crew seatback pockets 159, passenger overhead bins 161 and crew overhead bins 162, as well as other stowage compartments 163 including crew cabinets 164 and cargo holds 165 of the vehicle. As another example, maintenance phase 153 and production phase 154 can involve detection domains that further include other regions of the vehicle 166 and vehicle components 167, in addition to on-board stowage compartments 156.

Various sensors 170 can be used to provide foreign object detection 150, including integrated sensors 171 that form part of the vehicle, including seatback sensors 172, overhead bin sensors 173, cabinet sensors 174, and cargo hold sensors 175. Sensors 170 can further include maintenance sensors 176 and production sensors 177. As an example, maintenance sensors 176 and production sensors 177 can include an imaging system of one or more cameras and one or more illumination sources that are positioned to capture images of particular regions of the vehicle 166 or vehicle components 167.

Maintenance sensors 176 used during maintenance phase 153 and production sensors 177 used during production phase 154 can be temporarily positioned on-board the vehicle, positioned off-board the vehicle, or in relation to vehicle components 167 to be assembled. Maintenance sensors 176 and production sensors 177 can additionally or alternatively be installed within a maintenance or production facility, and the vehicle or vehicle components can be positioned relative to the sensors (e.g., within a field of view of a camera of an imaging system). The use of maintenance sensors 176 and production sensors 177 are described in further detail with reference to FIGS. 12, 13, and 14.

Each of sensors 170 can be associated with one or more detection domains 155. As examples, seatback sensors 172 can be used to provide foreign object detection with respect to seatback pockets 157, overhead bin sensors 173 can be used to provide foreign object detection with respect to overhead bins 160, cabinet sensors 174 can be used to provide foreign object detection with respect to crew cabinets 164, cargo hold sensors 175 can be used to provide foreign object detection with respect to cargo holds 165, maintenance sensors 176 and production sensors 177 can be used to provide foreign object detection with respect to other regions of the vehicle 166 and vehicle components 167.

Various notifications 180 can be generated responsive to detecting foreign objects for detection domains 155 using sensors 170. In at least some examples, a particular type of notification can be associated with a particular combination of vehicle lifecycle phases 151 and detection domains 155. As an example, foreign objects detected as part of operation phase 152 among passenger seatback pockets 158 and passenger overhead bins 161 can be associated with generating passenger notifications 181 and/or service personnel notifications 182, whereas foreign objects detected as part of operation phase 152 among crew seatback pockets 158, crew overhead bins 162, crew cabinets 164, and cargo holds 165 can be associated with generating service personnel notifications 182. Foreign objects detected as part of maintenance phase 153 among detection domains 155 can be associated with generating maintenance personnel notifications 183. Foreign objects detected as part of production phase 154 among detection domains 155 can be associated with generating production personnel notifications 184.

Figure 2A:
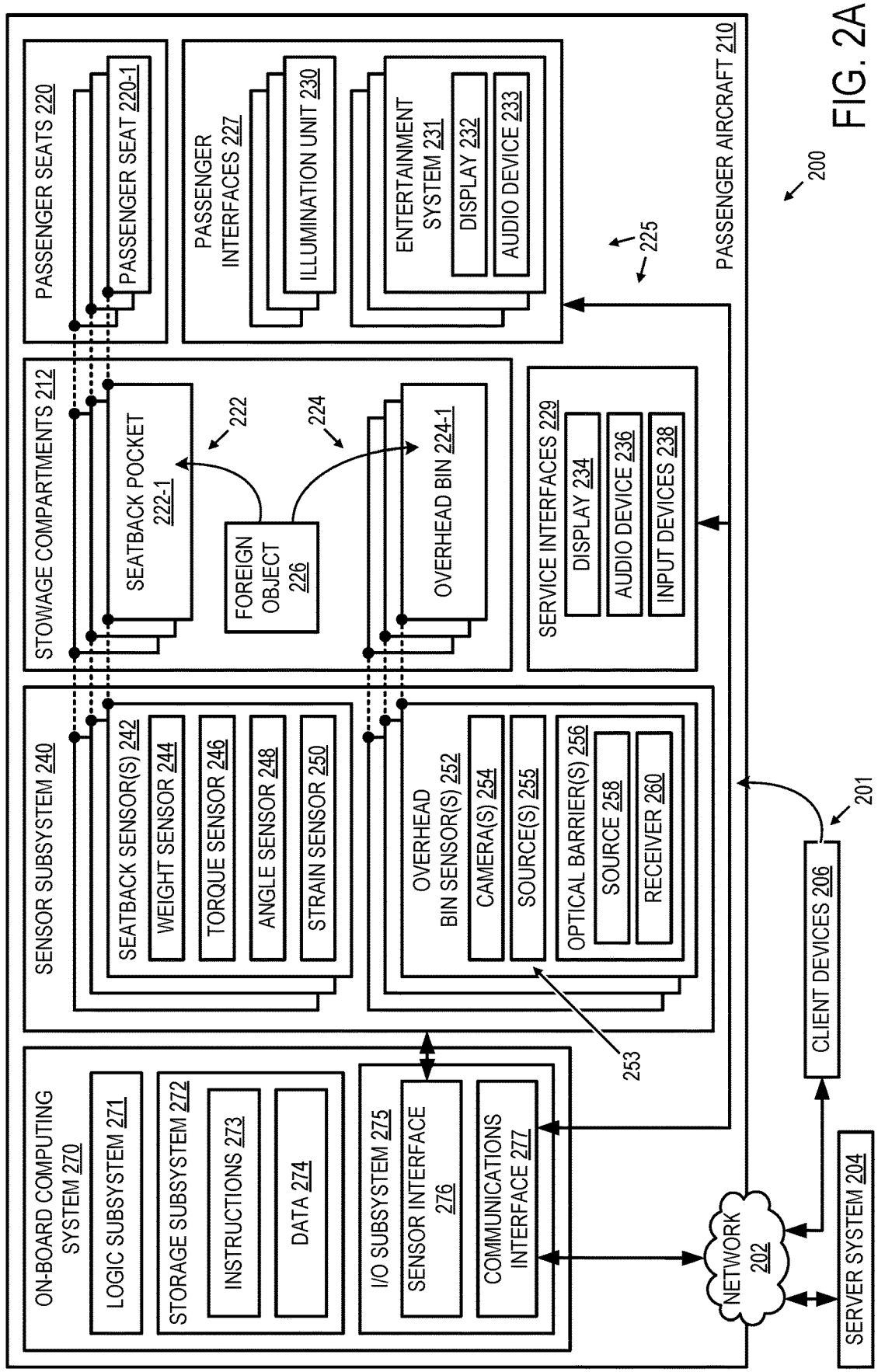
FIGS. 2A and 2B depict a schematic representation of an example detection system.
Figure 2B:
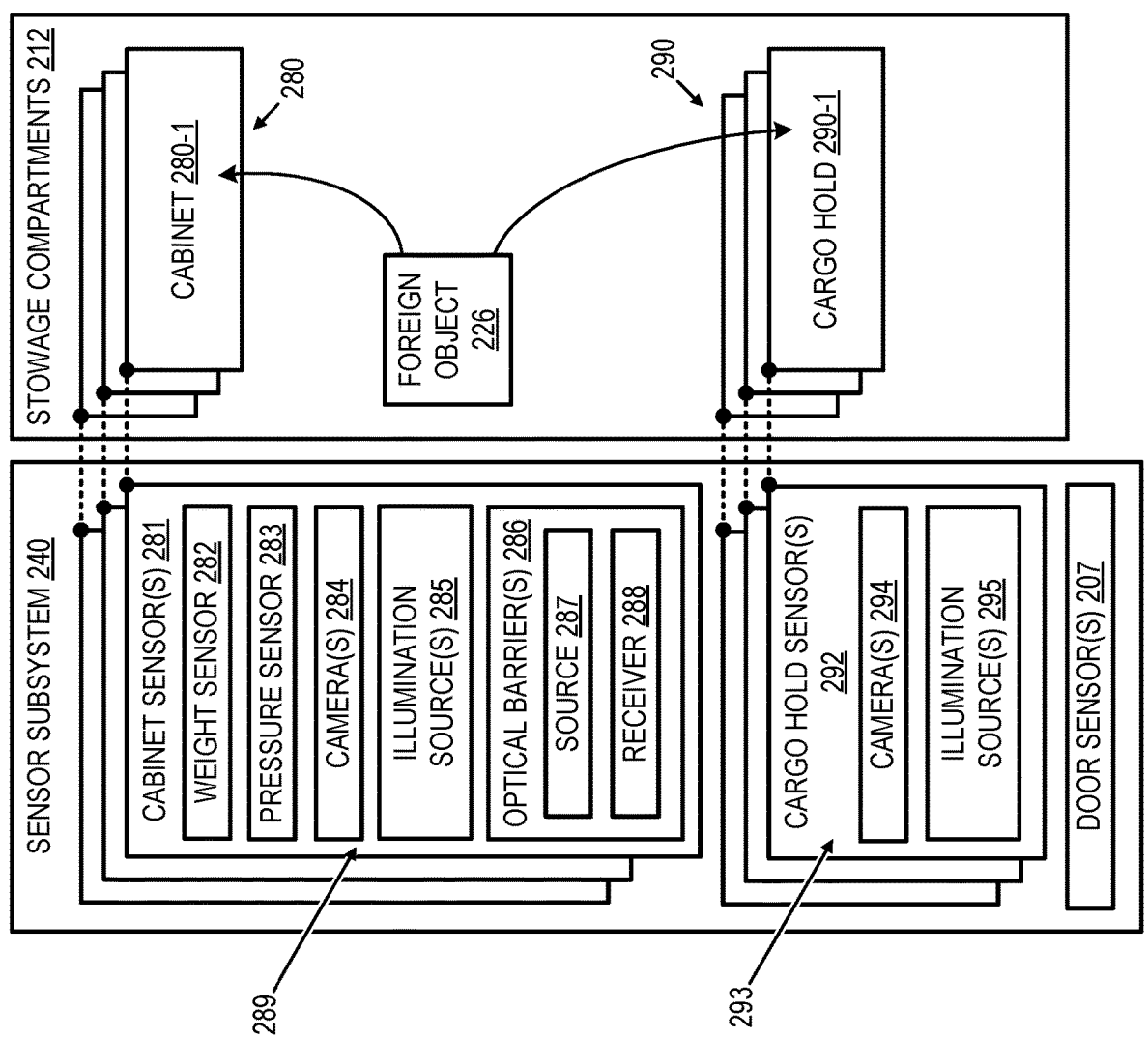

FIGS. 2A and 2B depict a schematic representation of an example detection system 200. In this example, detection system 200 is described within the context of a passenger aircraft 210. However, passenger aircraft 210 may take the form of other passenger or non-passenger vehicle types, including trains, buses, watercraft, spacecraft, etc. Aircraft 100 of FIG. 1A is one example of passenger aircraft 210 depicted schematically in FIGS. 2A and 2B. Passenger aircraft 210 includes a plurality of passenger seats 220, an example of which includes passenger seat 220-1.

Passenger aircraft 210 includes a plurality of stowage compartments 212, including a plurality of seatback pockets 222, an example of which includes seatback pocket 222-1. The plurality of stowage compartments 212 further include a plurality of overhead bins 224, an example of which includes overhead bin 224-1. FIG. 2A schematically depicts a foreign object 226 (e.g., a personal belonging of a passenger) being placed within either of seatback pocket 222-1 or overhead bin 224-1.

Passenger aircraft 210 includes a sensor subsystem 240 that includes a set of one or more seatback pocket sensors 242 for each of the plurality of seatback pockets 222. As examples, the set of seatback pocket sensors 242 may include one or more of the following sensors: (1) a weight sensor 244 (e.g., a piezo-electric sensor, force transducer, or other suitable sensor type) that provides a measurement of a weight applied to the seatback pocket as a translational force by contents stored therein, (2) a torque sensor 246 (e.g., a piezo-electric sensor, force transducer, or other suitable sensor type) that provides a measurement of a torque applied to the seatback pocket as a rotational force by contents stored therein, (3) an angle sensor 248 that provides a measurement of an angle or a distance between an outer wall of the seatback pocket and a mounting surface (e.g., a seatback or a wall) to which the outer wall is mounted (e.g., via a potentiometer, piezo-electric sensor, Hall effect sensor, distance sensor, etc.) or a measurement of an angle of the outer wall of the seatback pocket relative to the gravity vector (e.g., via an accelerometer, inclinometer, inertial sensor, etc.), (4) a strain sensor 250 that provides a measurement of a strain within the outer wall of the seatback pocket. The particular set of seatback pocket sensors associated with each seatback pocket may include some or all of the above seatback pocket sensors to detect foreign objects of various shape, size, weight, density, rigidity, compressibility, or other physical attribute.

Figure 3A:
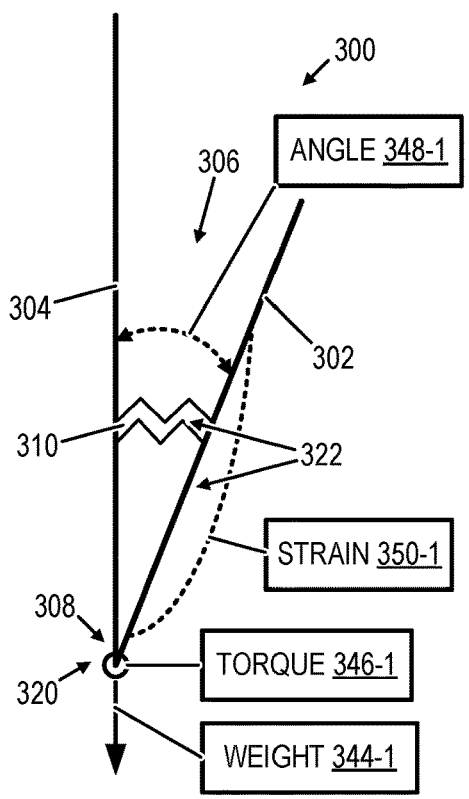
FIGS. 3A and 3B depict schematic representations of an example seatback pocket.
Figure 3B:
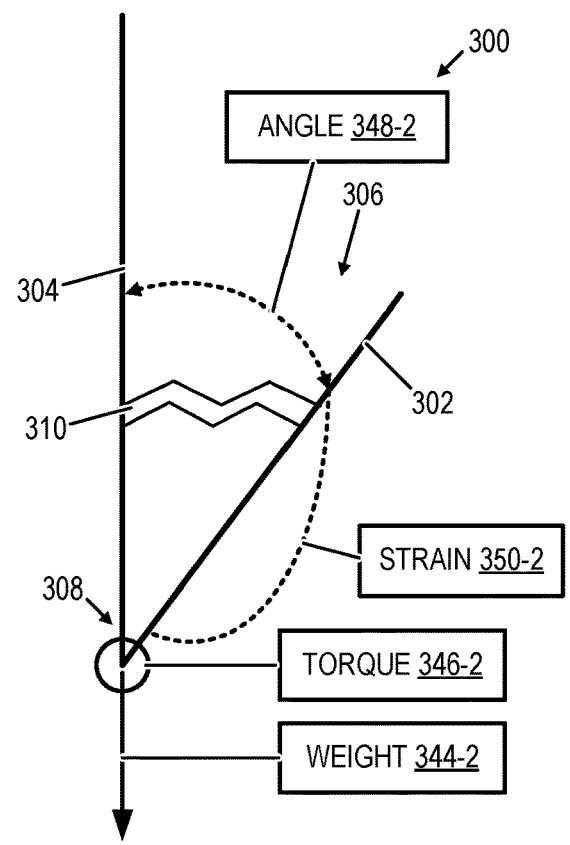

Referring also to FIGS. 3A and 3B, an example seatback pocket 300 is schematically depicted as being formed by an outer wall 302 and a mounting surface 304 (e.g., a seatback or a wall) that collectively defines a stowage region 306. Outer wall 302 may be mounted to mounting surface 304 along a lower edge 308 and/or opposing side portions 310 of the outer wall. In one example, outer wall 302 including opposing side portions 310 is formed of one or more textiles that permit the outer wall to flex and/or deform to accommodate objects within stowage region 306. In another example, outer wall 302 is formed at least partially by a rigid material, while opposing side portions 310 may be formed of a textile and/or a material having an accordion structure that permits the outer wall to expand and rotate about lower edge 308 as indicated by angle 348.

Weight sensor 244 of FIG. 2A provides a measurement of a weight 344-1 that is applied to seatback pocket 300 by objects located within stowage region 306. In an example, weight sensor 244 may be mounted at or near lower edge 308 as indicated at 320. Weight sensor 244 may include a first interface that is mounted to outer wall 302, a second interface that is mounted to mounting surface 304, and a sensing element that outputs sensor data representing a measurement of translational force between the first interface and the second interface.

Torque sensor 246 of FIG. 2A provides a measurement of a torque 346-1 is applied to seatback pocket 300 by objects located within stowage region 306. In an example, torque sensor 246 may be mounted at or near lower edge 308 as indicated at 320. Torque sensor 244 may include a first interface that is mounted to outer wall 302, a second interface that is mounted to mounting surface 304, and a sensing element that outputs sensor data representing a measurement of a rotational force between the first interface and the second interface.

Angle sensor 248 of FIG. 2A provides a measurement of the angle 348-1 between outer wall 302 and mounting surface 304 of seatback pocket 300. In an example, angle sensor 248 may be mounted at or near lower edge 308 as indicated at 320. Angle sensor 248 may include a first interface that is mounted to outer wall 302, a second interface that is mounted to mounting surface 304, and a sensing element that outputs sensor data representing a measurement of an angle of rotation between the first interface and the second interface.

Strain sensor 250 of FIG. 2A outputs sensor data representing a measurement of a strain 350-1 within outer wall 302 of seatback pocket 300. In at least some implementations, strain 350-1 may include strain measured within one or more of opposing side portions 310 of the outer wall. In an example, strain sensor 250 may be integrated with a textile that forms outer wall 302 and/or its opposing side portions 310.

Within FIG. 3B, seatback pocket 300 is schematically depicted with different measurements (e.g. increased measurements) of weight 344-2, torque 346-2, angle 348-2, and strain 350-2 as compared to FIG. 3A, which is the result of an object being placed within stowage region 306. According to one example, FIG. 3A depicts a baseline condition in which foreign objects are absent from stowage region 306, and FIG. 3B depicts an example in which one or more foreign objects are present within stowage region 306.

Referring again to FIG. 2A, sensor subsystem 240 further includes a set of one or more overhead bin sensors 252 for each of the plurality of overhead bins 224. The set of overhead bin sensors 252 may include an imaging system 253 of one or more optical sensors, including one or more cameras 254 and one or more illumination sources 255. Cameras 254 can include a visible light camera, an infrared light camera, a depth camera, etc. Illumination sources 255 can provide light within the visible, infrared, and/or other suitable spectrum that can be captured by cameras 254. At least some of cameras 254 may incorporate illumination sources 255 source (e.g., in infrared and/or visible light spectrums) to illuminate a scene being optically imaged by the camera.

The set of overhead bin sensors 252 may additionally or alternatively include optical barrier sensors 256. Each of optical barrier sensors 256 may include an electromagnetic radiation source 258 (e.g., visible light, infrared light, ultraviolet light, etc.) and an electromagnetic radiation receiver 260 between which an electromagnetic radiation path may be established that forms an optical barrier.

Figure 4A:
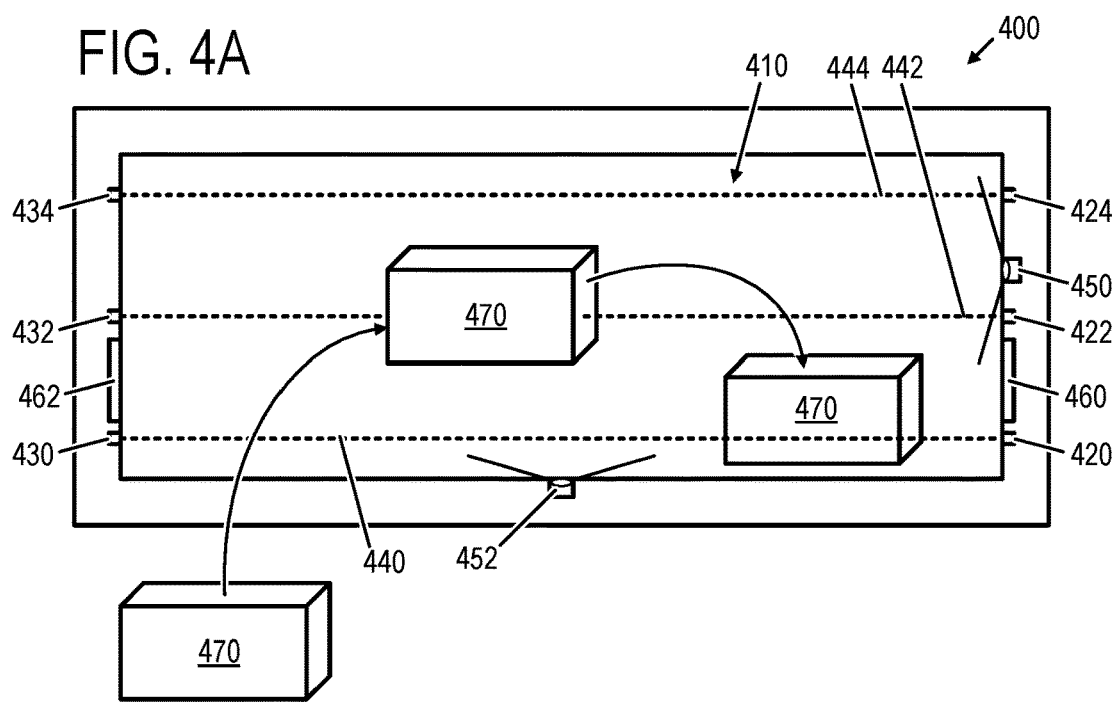
FIG. 4A depicts a schematic representation of an example overhead bin.

Referring also to FIG. 4A, an example overhead bin 400 is depicted schematically in an opened configuration revealing a stowage region 410 of the overhead bin. FIG. 4A depicts an example configuration of overhead bin sensors 252 of FIG. 2A. Optical barriers 440, 442, and 444 depicted in FIG. 4A are examples of electromagnetic optical barriers that may be provided by optical barrier sensors 256 of FIG. 2A. FIG. 4A depicts optical barrier 442 being breached by a foreign object 470 as the object is moved from outside of the overhead bin to within stowage region 410.

In FIG. 4A, optical barriers 440, 442, and 444 spanning stowage region 410 are provided by respective pairs of optical elements that includes an electromagnetic radiation source and receiver. The receiver of an optical barrier sensor outputs sensor data that varies responsive to a breach of the optical barrier by an object. As one example, optical elements 420, 422, and 424 include electromagnetic radiation sources, and optical elements 430, 432, and 434 include electromagnetic radiation receivers. As another example, optical elements 420, 422, and 424 include both an electromagnetic source and receiver, and optical elements 430, 432, and 434 may include mirror or other reflective surface. While FIG. 4A depicts an overhead bin including three optical barriers, it will be understood that overhead bins may include other suitable quantity of optical barriers, or that optical barrier sensor may be omitted in some implementations.

FIG. 4A further depicts overhead bin 400 including a camera 450 that images stowage region 410 and/or an entry region of the overhead bin in the vicinity of the door from an interior side wall of the bin. Alternatively or additionally, a camera 452 may be provided at an edge of the door frame or mounted on an interior of a door of the overhead bin at an orientation that enables the camera to image stowage region 410 from an exterior perspective looking into the bin. Cameras 450 and 452 are examples of previously described cameras 254 of FIG. 2A. As multiple objects are often stored in overhead bins, some embodiments can include multiple cameras (e.g., 450 and/or 452) disposed relative to stowage region 410, for example, to better assure that stored objects that may be blocked from the view of one or more cameras (e.g., by other stored objects) can be detected by one or more other cameras.

FIG. 4A further depicts an example in which display devices 460 and 462 are located within the overhead bin. A camera feed of the interior of the bin captured via one or more cameras (e.g., 450 or 452) may be displayed via display devices 460 and 462. This configuration may enable passengers or service personnel to easily check for low profile objects located on the floor of the overhead bin by viewing one of display devices. Display devices 460 and 462 are additional examples of passenger interfaces 229 or service personnel interfaces 227 of FIG. 2A.

Referring also to FIG. 2B, additional features of stowage compartments 212 and sensor subsystem 240 of FIG. 2A are schematically depicted. Stowage compartments 212 can include a plurality of storage cabinets 280 of which storage cabinet 280-1 is an example. Cabinets 280 can refer to crew cabinets that are available for use by service personnel on-board the vehicle, as an example. Each cabinet of the plurality of cabinets 280 can be associated with one or more cabinet sensors. For example, cabinet 280-1 is associated with one or more cabinet sensors 281. Examples of cabinet sensors 281 include a weight sensor 282, a pressure sensor 283, an imaging system 289 that includes one or more cameras 284 and one or more illumination sources 285, and one or more optical barriers 286. As previously described with reference to optical barriers 256 associated with overhead bins 224, each of optical barriers 286 can include a source 287 and a receiver 288.

Sensor subsystem 240 can include one or more door sensors 207 that can provide an indication of an open or closed state of one or more exterior doors of the aircraft or other vehicle. In at least some implementations, an audit for foreign objects can be conducted responsive to sensor data obtained from the door sensors 207 indicating the open or closed state.

Stowage compartments 212 can include a plurality of cargo holds 290 of which cargo hold 290-1 is an example. Each cargo hold of the plurality of cargo holds 290 can be associated with one or more cargo hold sensors. For example, cargo hold 290-1 is associated with one or more cargo hold sensors 292. Examples of cargo hold sensors 292 include an imaging system 293, which can include one or more cameras 294 and one or more illumination sources 295. The cameras and illumination sources of imaging systems 289 and 293 can operate in visible, infrared, and/or other suitable spectrum, as previously described with reference to imaging system 253 of FIG. 1A.

Referring again to FIG. 2A, passenger aircraft 210 includes an on-board computing system 270 of one or more computing devices. Computing system 270 includes a logic subsystem 271 and a data storage subsystem 272 having instructions 273 stored thereon that are executable by the logic subsystem to perform one or more of the methods or operations disclosed herein. Data storage subsystem 272 may further include data 274 stored thereon, which may include sensor data received from sensor subsystem 240 and/or other forms of data.

Computing system 270 further includes an input/output subsystem 275 that includes a sensor interface 276 by which sensor data is received from sensor subsystem 240 and by which computing system 270 may operate or otherwise control sensor subsystem 240. Input/output subsystem 275 may further include a communications interface 277 by which on-board computing system 270 communicates with other system components, including service interfaces 227 and passenger interfaces 229.

In at least some implementations, on-board computing system 270 may communicate over a communications network 202 with other computing devices or electronic components, such as a server system 204 and/or client devices 206. Some or all of on-board computing system 270, server system 204, client devices 206, etc. can form part of a computing system 201 that can implement the methods and operations described herein with respect to foreign object detection.

Communications network 202 may include a wired and/or wireless personal/local area network that provides network coverage on-board passenger aircraft 210. Communications network 202 may alternatively or additionally include a wireless wide area network by which on-board computing system 270 may communicate with terrestrial based wide area networks such as the Internet. Client devices 294 may reside on-board or off-board passenger aircraft 210, and may include personal computing devices carried by passengers and/or service personnel. Server system 204 may reside off-board passenger aircraft 210, and may include a plurality of terrestrial-based server computing devices that are geographically distributed.

Sensor interface 276 and communications interface 277 of input/output subsystem 275 may incorporate wired or wireless transceivers, amplifiers, filters, etc. configured to enable computing system 270 to send and receive data, issue control commands, and/or control electrical power supplied to the various components of detection system 200. Sensor interface 276 and communications interface 277 may support communications utilizing any suitable communications protocol or combination of protocols over wired and/or wireless links.

Passenger interfaces 229 can include a plurality of illumination units integrated with the aircraft of which illumination unit 230 is an example. Each illumination unit may be associated with a particular passenger seat or region of the passenger cabin. For example, an illumination unit may be provided on a ceiling or lower surface of an overhead bin of the aircraft for a group of seats located in a row. Computing system 270 may selectively illuminate a particular illumination unit to provide a visual indication to service personnel or passengers.

Passenger interfaces 229 can include a plurality of entertainment systems associated with respective passenger seats, an example of which is entertainment system 231. Each entertainment system can include a display device 232 and/or an audio interface or audio device 233 by which computing system 270 may output visual and/or audio data to passengers. An audio interface can include a physical audio connector to which a passenger may connect an audio device, such as headphones. An audio interface can additionally include a wireless interface by which audio data is transmitted for reception by client devices that are capable of outputting the audio data. Computing system 270 may selectively output a message via a particular display device and/or audio interface or audio device that is associated with a particular passenger seat of the aircraft. In at least some implementations, one or more display devices can be incorporated within overhead bins 224, and may provide a camera feed of the interior of the overhead bins that is captured via cameras 254. Passenger interfaces 227 are examples of output devices 225.

Service interfaces 227 can include one or more display devices 234 and/or one or more audio interfaces or devices 236, as previously described with reference to entertainment system 231. Service interfaces 227 may be integrated with the aircraft for use by service personnel, and may be located at service stations distributed throughout the aircraft. Alternatively or additionally, service interfaces may take the form of mobile client devices carried by service personnel, such as previously described with reference to client devices 206. Service interfaces 227 can include one or more input devices 238, by which service personnel may provide user input to computing system 270. Input devices 238 may include touch screens, keyboards or keypads, a pointing device such as a mouse, handheld controller, etc., inertial sensors, optical sensors, and/or human voice interfaces supported by a microphone. Display 234 and audio device 236 of service interfaces 229 are additional examples of output devices 225.

Figure 4B:
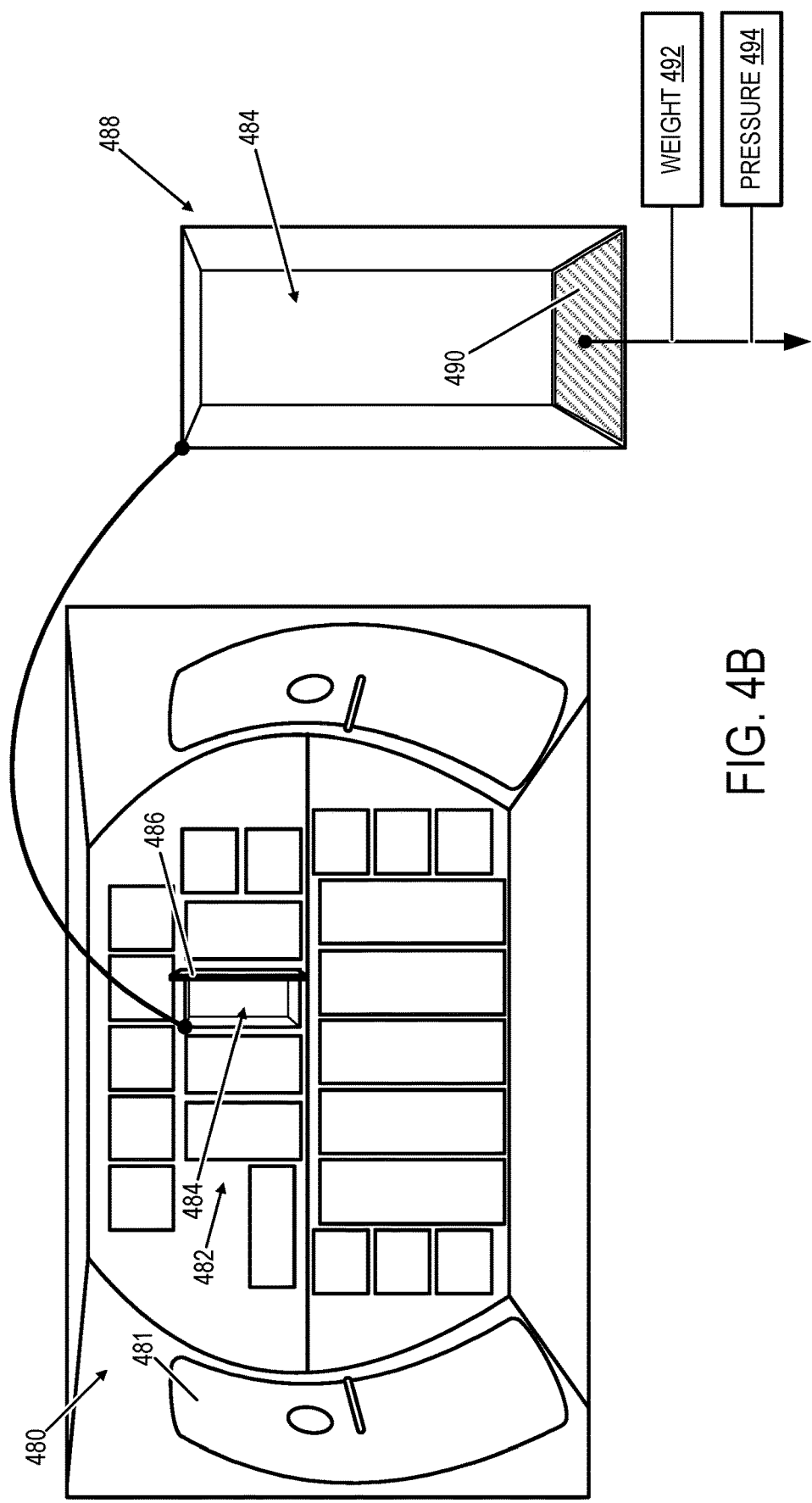
FIG. 4B depicts a schematic representation of an example service personnel region of a vehicle, including a service personnel stowage compartment in the form of a cabinet.

FIG. 4B depicts an example of a service personnel region 480 of a vehicle. For example, region 480 of FIG. 4B can refer to previously described service personnel region 140 of aircraft 100 of FIG. 1A. Region 480 can take the form of a galley of an aircraft, as an example. For example, FIG. 4B depicts region 480 within the vicinity of an exterior door 481 (e.g., a primary entrance and exit) of the vehicle. Within region 480, a plurality of stowage compartments 482 in the form of storage cabinets are provided, of which storage cabinet 484 is an example. Cabinet 484 is depicted in FIG. 4B with a cabinet door 486 in an open position to reveal an interior of the cabinet.

A detailed view of cabinet 484 is shown in FIG. 4B at 488. Cabinet 484 includes a cabinet floor 490, which can support objects stored within the cabinet. A weight 492 of objects stored within cabinet 484 upon cabinet floor 490 can be sensed by a weight sensor (e.g., weight sensor 282 of FIG. 2B). Alternatively or additionally, a pressure exerted on floor 490 by objects stored within cabinet 484 can be sensed by a pressure sensor (e.g., pressure sensor 283 of FIG. 2B). Weight 492 and pressure 494 can be used to detect the presence of a variety of different types of objects. For example, small, lightweight objects can be detected as localized regions of pressure applied to floor 490, as an example of pressure 494 sensed by pressure sensor 283. As another example, heavier objects can be detected as weight 492 and/or pressure 494.

Optical detection of foreign objects within storage cabinets, such as cabinet 484 can additionally or alternatively be provided using imaging system 289 and/or optical barriers 286 in a manner previously described with reference to the overhead bin of FIG. 4A.

Figure 5A:
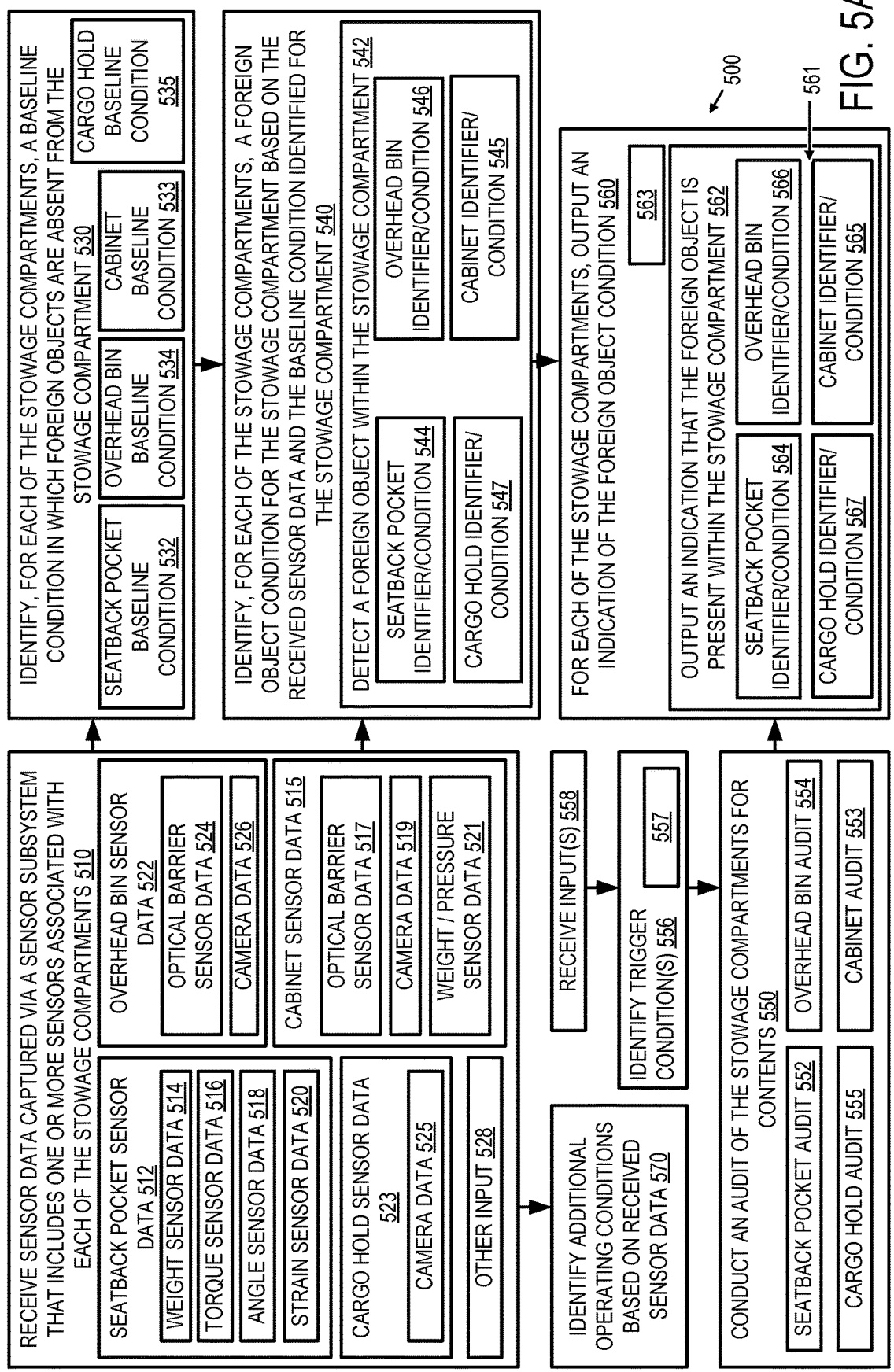
FIGS. 5A and 5B are flow diagrams depicting an example method for detecting a foreign object within a stowage compartment.
Figure 5B:
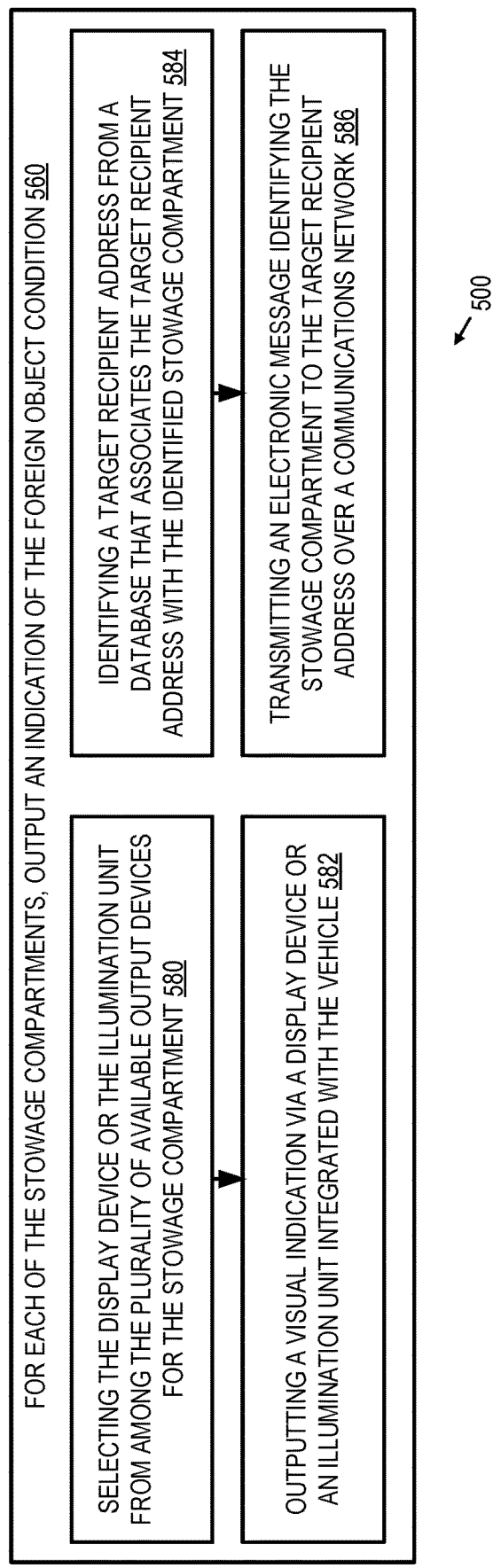

FIGS. 5A and 5B are flow diagrams depicting an example method 500 for detecting a foreign object within a stowage compartment. Method 500 can be performed by a computing system with respect to a vehicle that includes a plurality of stowage compartments. For example, method 500 can be performed by on-board computing system 270 of FIGS. 2A and 2B, or by a computing system that includes on-board computing system 270 in combination with one or more other computing devices or computing systems, such as server system 204 and/or client devices 206 of FIG. 2A.

At 510, the method includes receiving sensor data captured via a sensor subsystem that includes a sensor associated with each of a plurality of stowage compartments.

Within the context of seatback pockets, the sensor data received at 510 can include seatback pocket sensor data 512 for each seatback pocket. Seatback pocket sensor data can include one or more of weight sensor data 514, torque sensor data 516, angle sensor data 518, and/or strain sensor data 520.

Within the context of overhead bins, the sensor data received at 510 can include overhead bin sensor data 522 for each overhead bin. Overhead bin sensor data 522 can include one or more of optical barrier sensor data 524 and/or camera data 526 (e.g., representing static images and/or video).

Within the context of storage cabinets, the sensor data received at 510 can include cabinet sensor data 515 for each cabinet. Cabinet sensor data 515 can include one or more of optical barrier sensor data 517 and/or camera data 519 (e.g., representing static images and/or video). Additionally or alternatively, cabinet sensor data 515 can include weight sensor data and/or pressure sensor data 521.

Within the context of cargo holds, the sensor data received at 510 can include cargo hold sensor data 523 for each cargo hold. Cargo hold sensor data 523 can include camera data 525 (e.g., representing static images and/or video).

Sensor data received at 510 can include other input 528, which can include sensor input from additional sensors located on-board the aircraft and/or user input received via a user input device or interface.

At 530, the method includes identifying, for each of the plurality of stowage compartments, a baseline condition in which foreign objects are absent from the stowage compartment. For example, a seatback pocket baseline condition 532 can be identified for each seatback pocket, an overhead bin baseline condition 534 can be identified for each overhead bin, a cabinet baseline condition 533 can be identified for each storage cabinet, and a cargo hold baseline condition 535 can be identified for each cargo hold or cargo hold region. The baseline condition identified at 530 for a particular stowage compartment may be based on sensor data captured at 510 at a particular time by the one or more sensors associated with the stowage compartment. For example, sensor data received from each sensor can be stored as baseline measured values within a data storage subsystem of the on-board computing system or other computing system.

Baseline conditions 532, 533, 534, and 535 can be identified at the same time or at different times. As an example, the seatback pocket baseline condition 532 can be identified for some or all of the seatback pockets at the same time or at a different time than the overhead bin baseline condition 534 is identified for some or all of the overhead bins. As another example, baseline conditions for stowage compartments available for use by service personnel and not available for use by passengers can be identified at a different time than baseline conditions for stowage compartments available for use by passengers. As yet another example, baseline conditions for cargo holds or regions thereof can be identified at a different time than baseline conditions for other stowage compartments that are available for use by passengers or service personnel.

In at least some implementations, the baseline condition is identified responsive to receiving a user input via a service personnel interface or responsive to a sensor input from a sensor located on-board the aircraft (e.g., as other input 528). As one example, service personnel may provide a user input to the computing system via a service personnel interface to measure or otherwise identify the baseline condition for some or all stowage compartments of the aircraft at a particular time, such as before boarding of passengers onto the aircraft, before boarding of service personnel onto the aircraft, or before loading of the cargo holds. However, in another example, sensor input can be received from other sensors located on-board the aircraft responsive to which the baseline condition is identified without necessarily relying on human input. In situations where service objects, such as blankets, beverages, menus, magazines, etc. are to be included in stowage compartments, the baseline condition can be identified at 530 with those service objects already stowed within the stowage compartments, thereby incorporating those service objects into the identified baseline condition.

At 540, the method includes, for each of the plurality of stowage compartments, identifying a foreign object condition for the stowage compartment based on the sensor data received for the stowage compartment and the baseline condition identified for the stowage compartment. A foreign object condition can include an empty condition in which foreign objects are absent from the stowage compartment or a present condition in which one or more foreign objects are present within the stowage compartment.

At 542, for example, a foreign object is detected within the stowage compartment at a time after the baseline condition is identified at 530. As one example, sensor data can be continuously received from one or more sensors associated with the stowage compartment and compared to the baseline condition to determine a measured deviation from the baseline condition. The measured deviation can be compared to a threshold for the one or more types of sensors. Each sensor type or combination of sensor types can be associated with a respective threshold. If the measured deviation from the baseline condition exceeds the threshold, the foreign object condition for the stowage compartment can be identified as the present condition, indicating that a foreign object is within the stowage compartment. However, if the measured deviation does not exceed the threshold, the foreign object condition can be identified as the empty condition, indicating that foreign objects are absent from the stowage compartment.

For configurations in which multiple sensors are associated with a stowage compartment, a combination of sensor data received from the multiple sensors can be compared to the same combination of sensor data received from the multiple sensors at a time that the baseline condition was identified to identify the foreign object condition for the stowage compartment. A sensor-specific weighting can be applied to sensor data received from a particular sensor type within a combination of sensor data received from multiple sensor types. As one example, seatback angle sensor data can be weighted less than seatback weight, torque, or strain sensor data within the combination of sensor data.

In at least some implementations, a seatback pocket identifier and an associated foreign object condition can be identified for each seatback pocket at 544, an overhead bin identifier and an associated foreign object condition can be identified for each overhead bin at 546, a cabinet identifier and an associated foreign object condition can be identified for each cabinet at 545, and a cargo hold identifier and an associated foreign object conditions can be identified for each cargo hold or region thereof at 547. The use of identifiers of stowage compartments is described in further detail with reference to FIGS. 8A-8C and FIGS. 9A-9C.

At 550, the method includes conducting an audit of the plurality of stowage compartments for contents. A seatback pocket audit 552, an overhead bin audit 554, a cabinet audit 553, and a cargo hold audit 555 can be conducted in parallel or independent of each other responsive to a trigger condition or different, respective trigger conditions 557 identified at 556 for each type of stowage compartment. Identifying one or more trigger conditions at 556 can be based on one or more inputs received at 558, which can include sensor input received at 510 or other suitable input. As one example, service personnel can provide a user input via a service personnel interface to conduct the audit at 550. As another example, the audit conducted at 550 can be in response to sensor input received from a door sensor associated with an exterior door of the aircraft indicating that the door has been opened at the conclusion of service. As yet another example, the audit conducted at 550 can be in response to a threshold quantity of overhead bin doors (e.g., a majority) or cabinet doors being opened following a service event in which the overhead bin doors or cabinet doors were closed, as may be detected by observed changes in lighting conditions via one or more optical sensors (cameras or receivers).

At 560, the method includes, for each of the plurality of stowage compartments, outputting an indication of the foreign object condition with respect to the stowage compartment. As an example, the indication of the foreign object condition can be output based on the audit conducted or otherwise responsive to initiating the audit at 550. As another example, the indication of the foreign object condition can be output at predefined time intervals or continuously.

In one example, outputting the foreign object condition includes outputting an indication that the foreign object is present within the stowage compartment at 562. In at least some implementations, the seatback pocket identifier and the foreign object condition can be identified for each seatback pocket at 564, the overhead bin identifier and the foreign object condition can be identified for each overhead bin at 566, the cabinet identifier and the foreign object condition can be identified for each cabinet at 565, and the cargo hold identifier and the foreign object condition can be identified for each cargo hold or cargo hold region at 567. Within FIG. 5A, the example indications 561 output at 564, 565, 566, and 567 indicate that a foreign object is present within the respective stowage compartment. Alternatively or additionally, outputting the foreign object condition includes outputting an indication of an absence of foreign objects within the stowage compartment at 563. Example indications 561 output at 564, 565, 566, and 567 can alternatively or additionally indicate that foreign objects are absent from the respective stowage compartment as part of operation 563.

Referring to FIG. 5B, as one example, outputting the indication that a foreign object is present within a stowage compartment or absent from a stowage compartment can include outputting a visual indication via a display device or an illumination unit integrated with the vehicle at 582. For configurations in which the display device or the illumination unit is one of a plurality of available output devices integrated with the vehicle, the method can further include selecting the display device or the illumination unit from among the plurality of available output devices based on the identified stowage compartment at 580. For example, a database (e.g., data 274 of FIG. 2) stored within a data storage subsystem (e.g., on-board the aircraft or within a remotely located server system) can associate each passenger seat with a particular illumination unit and/or display device that can be referenced by the computing system.

As another example, outputting the indication that a foreign object is present within a stowage compartment includes transmitting an electronic message identifying the stowage compartment to a target recipient address over a communications network at operation 586. In this example, the method can further include, at 584, identifying the target recipient address from a database stored on-board the aircraft or at a remotely located server system that associates the target recipient address with the stowage compartment for vehicle operations occurring between identifying the baseline condition for the stowage compartment and conducting the audit. The target recipient address can include an email address, phone number, or other service identifier of a passenger or personnel.

At 570, the method can include detecting one or more additional operating conditions based on sensor data received at 510. As one example, the method at 570 further includes detecting a fire or smoke condition within one of the plurality of overhead bins, cabinets, or cargo holds via an optical sensor associated with the stowage compartment, and outputting an indication of the fire or smoke condition via an output device (e.g., a display device or audio device, etc.). Optical sensors of a stowage compartment can be used to detect the presence of fire based on illuminance of image pixels exceeding a threshold and/or exhibiting a particular color within a predetermined range, as examples. The presence of smoke can be detected via an optical barrier sensor based on its sensor data exhibiting a predefined breach pattern or partial breach pattern indicative of smoke occlusion, as an example. Predefined values for identifying the presence of fire and/or smoke can be stored within a data storage subsystem on-board the vehicle.

As another example, the method at 570 includes aggregating the seatback pocket sensor data (e.g., strain sensor data and/or other sensor data) received over time to obtain an aggregate value for each of the plurality of seatback pockets. An aggregate fatigue condition can be detected for each of the plurality of seatback pockets based on the aggregate value for the seatback pocket, and an indication of the aggregate fatigue condition for the seatback pocket can be output that identifies the seatback pocket among the plurality of seatback pockets. For example, the aggregate fatigue value can be compared to a threshold to determine whether a seatback pocket is to be replaced or repaired.

As yet another example, an operating condition indicating that a service object has been removed from the stowage compartment can be detected based on the audit conducted at 550. Within the context of seatback pockets, measured values of weight, torque, angle, and/or strain that are less than their baseline values indicate that the service object has been removed from the stowage compartment. In this case, an indication can be output via a service personnel interface or client device identifying the seatback pocket among the plurality of seatback pockets, enabling service personnel to attend to replacement of service objects within the seatback pocket.

Figure 6A:
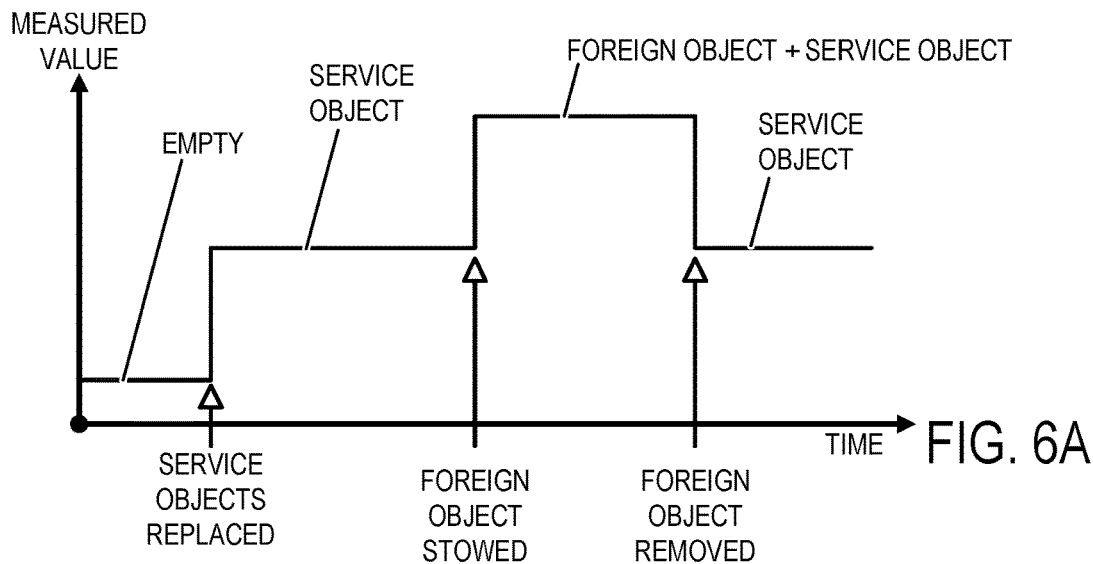
FIGS. 6A, 6B, and 6C depict example timelines in which operations of the method of FIGS. 5A and 5B are performed with respect to a seatback pocket.
Figure 6B:
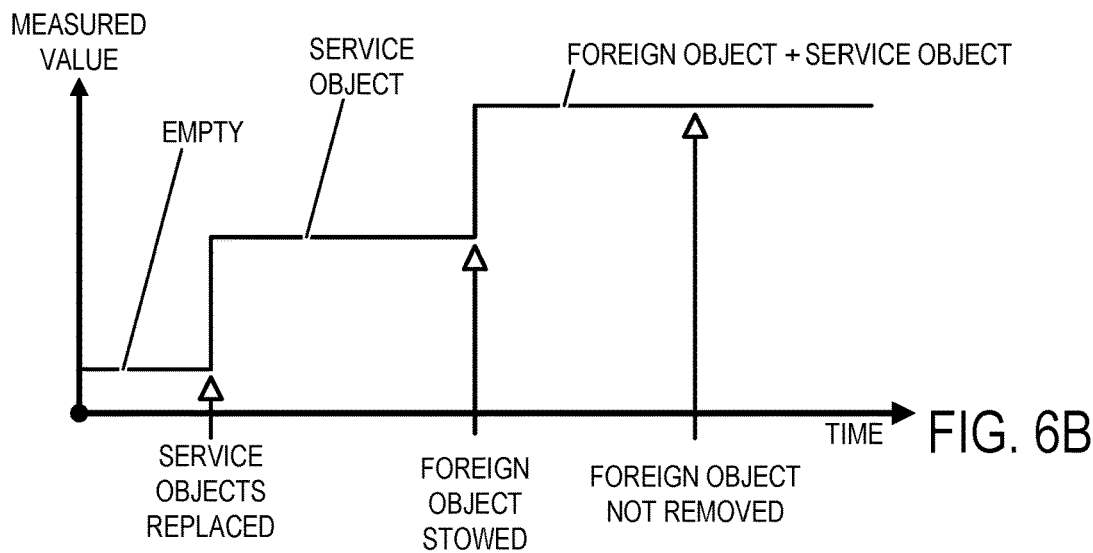
Figure 6C:
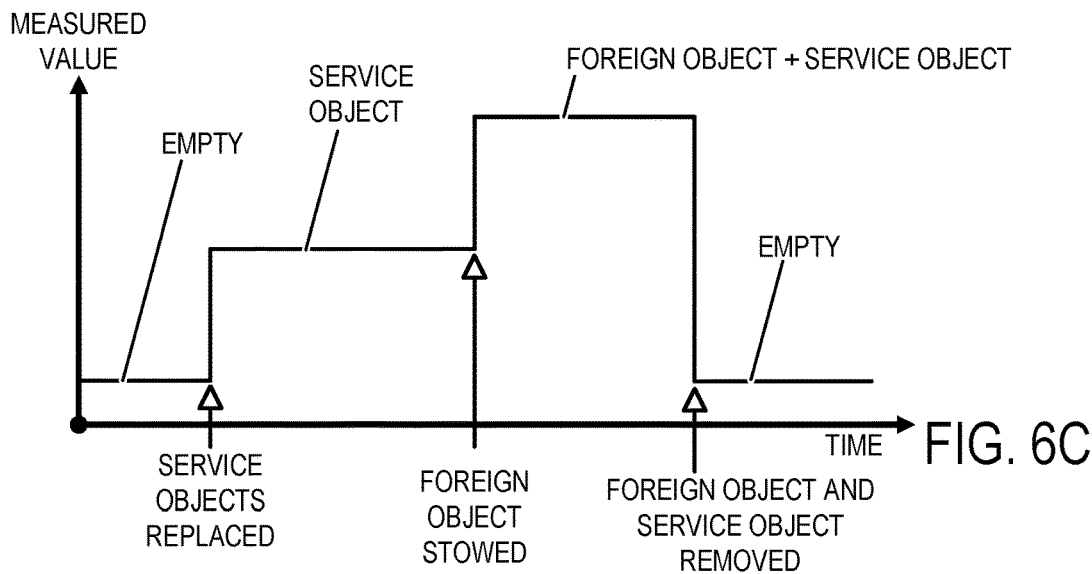

FIGS. 6A, 6B, and 6C depict example timelines in which operations of method 500 are performed with respect to a seatback pocket. In each of the example timelines, the horizontal axis represents the time dimension and the vertical axis represents a measured value received from a seatback pocket sensor, which may include one or more of a weight, torque, angle, and/or strain sensor as previously described with reference to FIGS. 2A, 3A, and 3B. The timelines of FIGS. 6A, 6B, and 6C can similarly represent measured values of a weight sensor or pressure sensor of a storage cabinet, such as previously described with reference to FIGS. 2B and 4B.

In FIG. 6A, a service object (e.g., a complimentary item such as a magazine) is stowed within an initially empty seatback pocket by service personnel as part of a replacement operation performed prior to passengers boarding the aircraft. Upon adding the service object to the seatback pocket, the measured value received from the sensor increases, reflecting an increase in the measured weight, torque, angle, and/or strain. As previously described with reference to operation 530 of FIG. 5A, the baseline condition can be identified following the replacement of service objects, but prior to boarding of the aircraft by passengers. In this manner, presence of the service object within the seatback pocket is incorporated in the measured value for the baseline condition. Next, a passenger stows a foreign object in the seatback pocket, which further increases the measured value, reflecting a further increase in the measured weight, torque, angle, and/or strain. At the conclusion of service, the passenger removes the foreign object from the seatback pocket and deboards the aircraft, resulting in a decrease in the measured value to approximately the baseline condition. An audit conducted following the removal of the foreign object may be used to identify a foreign object condition in which foreign objects are absent from the seatback pocket.

In FIG. 6B, the passenger instead deboards the aircraft without removing the foreign object or the service object from the seatback pocket. An audit conducted following the deboarding of the passenger may be used to identify a foreign object condition in which the foreign object is detected as being present within the seatback pocket.

In FIG. 6C, the passenger instead deboards the aircraft after removing both the foreign object and the service object from the seatback pocket. An audit conducted following removal of the foreign object and service object can be used to identify a foreign object condition in which the foreign object is not present and the additional operating condition that the service object is not present in the seatback pocket. By conducting an audit following deboarding of the aircraft by passengers, seatback pockets that retain their service objects can be distinguished from seatback pockets no longer containing service objects, thereby enabling service personnel to more quickly and easily replace service objects within the appropriate seatback pockets.

FIG. 7 depicts an example timeline and flow diagram 700 in which operations of method 500 are performed with respect to an overhead bin or a storage cabinet. Referring to the timeline, an optical barrier provided by an optical barrier sensor associated with an overhead bin or cabinet is breached as indicated by breach event 710. Referring to the flow diagram, breach event 710 is detected at 740 upon receiving sensor data from the optical barrier sensor. Breaches of the optical barriers can be used by the computing system to identify time periods in which images or video captured via cameras associated with the overhead bin or cabinet are to be analyzed for foreign objects. However, optical barriers can be omitted in at least some implementations.

At 742, one or more images are captured by a camera associated with the overhead bin or cabinet within a period of time 712 corresponding to the breach event at 710. The camera can be positioned to optically image the interior and/or entrance region of the overhead bin or cabinet containing the optical barrier. In an example, the camera can continuously capture a video feed in which a timing of breach event 710 is used to identify images within the video feed that correspond in time with the breach. In FIG. 7, the period of time 712 is depicted as beginning before breach event 710 and ending after the breach event, which provides an example in which images captured before and/or after the breach may be identified in addition to images captured during the breach event. In at least some implementations, the continuous video feed or sequence of images can be stored in a circular buffer configured to store a predefined duration of video or quantity of images for the overhead bin or cabinet within a storage subsystem of the aircraft from which images may be retrieved and analyzed. In another example, the camera may be operated to capture one or more images in response to the breach event, without capturing a continuous video feed.

At 744, an optical flow direction is identified for breach event 710 based on the one or more images captured at 742. Computer vision techniques can be applied to the one or more images captured at 742 to determine the optical flow direction of an object responsible for the breach event as either traveling into the overhead bin or cabinet (i.e., inbound direction) or traveling out of the overhead bin or cabinet (i.e., outbound direction). Within an individual image, a direction of blur associated with movement of the object within the image frame can be used to determine the optical flow direction. Additionally or alternatively, comparing a change in position of similar features of the object (e.g., one or more pixels) within two or more images of a time-series of images can be used to determine the optical flow direction.

For the inbound direction, an identification of the object can be created at 746 by associating identification data with an object identifier. The identification data can include raw and/or segmented image frames containing the object or portions of the object. The identification data can additionally or alternatively include a set of one or more features of the object that were extracted from the image frames using a feature extraction algorithm. Such features can include or be indicative of a color, shape, size, or other suitable feature of the object. The identification data for the object can be stored at 748 along with the object identifier. A counter representing a quantity of objects within the overhead bin or cabinet can be incremented to indicate that the object was added to the overhead bin.

Referring again to the timeline, additional breach events occurring at 714, 718, 730, and 734 can be detected at 740, and additional images captured by the camera can be identified over periods of time 716, 720, 730, and 734, respectively, that correspond to those breach events. In this example, breach events 710, 714, and 718 have an optical flow direction determined to be in the inbound direction, such as at the time of boarding of the aircraft. Therefore, following breach event 718, identification data is created and stored for three objects that were added to the overhead bin or cabinet along with respective object identifiers, and the counter representing the quantity of objects within the overhead bin or cabinet has been incremented to indicate that three objects are within the stowage compartment.

Subsequent breach events 730 and 734, in this example, have an optical flow direction determined to be in the outbound direction, such as at the time of deboarding of the aircraft. For the outbound direction, each object may be reidentified by referencing the identification data previously created and stored for the inbound objects. As an example, object recognition algorithms may be applied to image frames captured during period of time 732 and 736 corresponding to the outbound breach events using the identification data previously created and stored for the inbound breach events to identify which objects have been removed from the overhead bin or cabinet.

At 752, the identification data is updated to reflect the removal of the identified objects from the overhead bin or cabinet, and the counter is decremented to reflect the removal of the identified objects. For example, following breach events 730 and 734, the counter indicates that one object remains in the overhead bin or cabinet. Current images of the remaining object and/or previously stored images of that object that were captured during the inbound breach can be output to one or more display devices, enabling passengers or service personnel to identify and retrieve the object from the overhead bin or cabinet. The display device can be located within the overhead bin or cabinet, or can form part of an on-board entertainment system of a passenger seat associated with the overhead bin or cabinet, a service interface, a client device of service personnel, or a client device of a passenger associated with the stowage compartment based on seat assignment.

In at least some implementations, optical detection of foreign objects within stowage compartments (e.g., overhead bins, cabinets, and cargo holds) using cameras can be performed without the use of optical barriers. As one example, one or more cameras associated with each stowage compartment can be used to identify whether foreign objects are present within the stowage compartment by comparing, at 760, a current image of the interior of the stowage compartment with a baseline image of the interior of the stowage compartment that was captured at 702 as part of identifying the baseline condition at operation 530 of FIG. 5A. This comparison can be performed on a pixel-by-pixel basis of spatially aligned pixels extracted from each of the image frames being compared. As one example, a foreign object can be detected within the stowage compartment upon identifying a threshold quantity of pixels grouped within a region of the image that exhibit a threshold difference in a pixel value from the spatially aligned pixels of the baseline image.

Changes in lighting conditions between a baseline image and a subsequent image may be accounted for by normalizing the images with respect to red, green, and blue pixel values. The one or more cameras associated with each stowage compartment can include an infrared camera that incorporates an infrared light source (e.g., as an example of an illumination source) for illumination of the imaged scene, thereby reducing or eliminating variations in lighting conditions between baseline and subsequent images due to changes in lighting conditions within the visible spectrum.

The one or more cameras associated with each stowage compartment can include a depth camera that measures a depth of objects within the imaged environment on a per pixel basis. Measuring depth within an image can include the use of (Light Detection and Ranging) LIDAR, stereoscopic cameras, or other suitable techniques. A foreign object can be identified within the stowage compartment by comparing the depth values of the baseline image with the depth values of a current image on a pixel-by-pixel basis. A depth difference threshold can be applied to determine whether a pixel of the current image represents an object or a portion thereof that is closer to the camera than the corresponding pixel in the baseline image. A foreign object can be detected upon a threshold quantity of pixels exhibiting the depth difference threshold within a region of the current image.

In at least some implementations, comparisons between baseline sensor data (e.g., baseline images) and current sensor data (e.g., current images), for example, as part of operation 760, can be performed by a machine learning model that was previously trained using at least the baseline sensor data as training examples of stowage compartments that do not contain a foreign object. Within the context of a vehicle that includes multiple instances of a stowage compartment configuration (e.g., overhead bins, cabinets, cargo holds, etc.), baseline images of an exemplary stowage compartment can be used as training data or as baseline images for other stowage compartments having the same or similar configuration.

FIGS. 8A, 8B, and 8C depict example tables describing example data associations 800, 810, and 820, respectively, that can be maintained for detection system 200 of FIGS. 2A and 2B. As one example, data associations 800, 810, and 820 can be maintained by computing system 270 creating, storing, updating, and referencing the data associations within data 274 of FIG. 2A. Alternatively or additionally, data associations 800, 810, and 820 can be maintained by a remotely located computing system or computing device, such as example server system 204 or client devices 294 of FIG. 2A.

Within FIG. 8A, data association 800 associates a seat identifier assigned to each passenger seat on-board a vehicle with one or more of: (1) a seatback pocket identifier assigned to each seatback pocket, (2) seatback pocket sensor data representing measurements obtained from one or more seatback pocket sensors associated with each seatback pocket, (3) a foreign object condition identifier for each seatback pocket, (4) other operating conditions identified for each seatback pocket (e.g., representing an aggregate fatigue condition), (5) an overhead bin identifier assigned to each overhead bin, (6) overhead bin sensor data representing measurements obtained from one or more overhead bin sensors associated with each overhead bin, (7) a foreign object condition identifier for each overhead bin, and (8) other operating conditions identified for each overhead bin (e.g., representing a fire or smoke condition). Sensor data of data association 800 can take the form of a time-series or stream of sensor data that is received over time from each sensor. Additional data fields can be included in data association 800, such as to include a baseline condition identified for each seatback pocket and for each overhead bin.

Within FIG. 8B, data association 810 associates a cabinet identifier assigned to each storage cabinet on-board a vehicle with one or more of (1) a cabinet identifier assigned to each cabinet, (2) cabinet sensor data representing measurements obtained from one or more cabinet sensors associated with each cabinet, and (3) other operating conditions identified for each cabinet (e.g., representing a fire or smoke condition). Sensor data of data association 810 can take the form of a time-series or stream of sensor data that is received over time from each sensor. Additional data fields can be included in data association 810, such as to include a baseline condition identified for each cabinet.

Within FIG. 8C, data association 820 associates a cargo hold identifier assigned to each cargo hold or cargo hold region of a vehicle with one or more of (1) a cargo hold identifier assigned to each cargo hold or region, (2) cargo hold sensor data representing measurements obtained from one or more cargo hold sensors associated with each cargo hold, and (3) other operating conditions identified for each cargo hold (e.g., representing a fire or smoke condition). Sensor data of data association 820 can take the form of a time-series or stream of sensor data that is received over time from each sensor. Additional data fields can be included in data association 820, such as to include a baseline condition identified for each cargo hold.

FIG. 9A depicts an illustration of an example passenger cabin 900 of an aircraft. In at least some implementations, graphical representations of passenger cabins, such as depicted in FIG. 9A, may be presented via a display device used by service personnel or passengers to output an indication that a foreign object is present within a stowage compartment of the aircraft, or that other operating condition is present. In this example, passenger seats 910 are arranged in rows on either side of a central walkway, and are divided into a premium seating section 912 and an economy seating section 914. However, it will be understood that other suitable seating configurations may be used.

In the example of FIG. 9A, seats or regions of the aircraft that are associated with stowage compartments within which a foreign object has been detected are presented in a manner that is visually distinguishable from seats or regions that are associated with stowage compartments within which foreign objects have not been detected. Visual indicators such as color, shape, size, patterning, highlighting, and/or labeling may be used to visually distinguish seats or regions of an aircraft from each other.

As one example, within seating section 912, a foreign object has been detected within a seatback pocket associated with seat 920, such as the seatback pocket mounted to the seatback of seat 924. In contrast to seat 920, foreign objects are not detected within seatback pockets associated with seats 922, 924, 926. Accordingly, seat 920 is presented in a manner that is visually distinguishable from surrounding seats 922, 924, 926, for example, by using a different color.

As another example, within seating section 912, a foreign object has been detected within an overhead bin associated with seats 930 and 932, such as the overhead bin residing directly above seats 930 and 932. In contrast to seats 930 and 932, foreign objects are not detected within overhead bins associated with seats 934, 936, 938, and 940. Accordingly, seats 930 and 932 are presented in a manner that is visually distinguishable from surrounding seats 934, 936, 938, and 940, for example, by using a different color and/or patterning. Seats 930 and 932 are also presented in a manner that is visually distinguishable from seat 920, thereby representing the type of stowage compartment within which a foreign object has been detected. Additionally, in this example, a region 950 is presented in a manner that is visually distinguishable from other regions of the aircraft. Region 950 represents the overhead bin within which the foreign object has been detected.

Within seating section 914, a foreign object has been detected within a seatback pocket associated with seat 960, and another foreign object has been detected within an overhead bin associated with a group of six seats 970. Accordingly, seat 960 and the group of six seats 970 are presented in a manner that graphical indicates that foreign objects have been detected within stowage compartments associated with these seats. Additionally, in this example, a region 972 is presented in a manner that is visually distinguishable from other regions of the aircraft. Region 972 represents an overhead bin within which the foreign object has been detected. In contrast to the overhead bin example of seating section 912 that is associated with two seats, the overhead bin of seating section 914 is instead associated with six seats.

FIG. 9B depicts another illustration of example passenger cabin 900. Similar to FIG. 9A, graphical representations of passenger cabins, such as depicted in FIG. 9B, may be presented via a display device. In the example of FIG. 9B, overhead bins are graphically represented in place of passenger seats. Previously described regions 950 and 972 of FIG. 9A representing overhead bins containing foreign objects are instead depicted in FIG. 9B as overhead bins 980 and 982, and are presented in a manner that is visually distinguishable from other overhead bins that do not contain foreign objects, such as overhead bin 984.

FIG. 9C depicts another illustration of a portion of passenger cabin 900. Similar to FIGS. 9A and 9B, graphical representations of passenger cabins, such as depicted in FIG. 9C, may be presented via a display device. In this example, a plurality of storage cabinets 990 intended for flight crew members are graphically represented, of which storage cabinet 992 that contains a foreign object is presented in a manner that is visually distinguishable from other cabinets of the plurality of crew cabinets 990 that do not contain foreign objects.

Figure 10A:
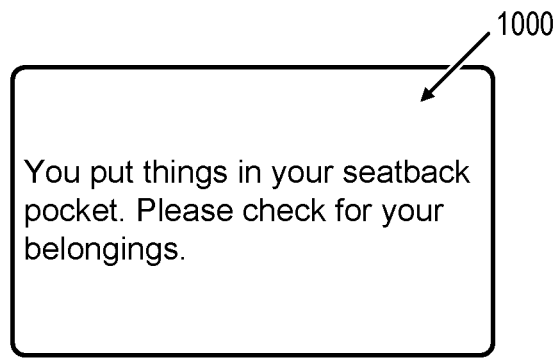
FIGS. 10A, 10B, 10C, and 10D depict example messages that can be output as notifications to provide an indication that a foreign object has been detected within a stowage compartment.

FIG. 10A depicts an example message 1000 that may be output to provide an indication to a passenger still located on-board an aircraft that a foreign object is currently present within a seatback pocket. In this example, message 1000 identifies the stowage compartment as a seatback pocket. Message 1000 may be output by displaying the message via a display device or by audibly reading the message as computer-generated speech via an audio interface of an integrated entertainment system associated with the passenger's seat or the passenger's personal electronic device.

Figure 10B:
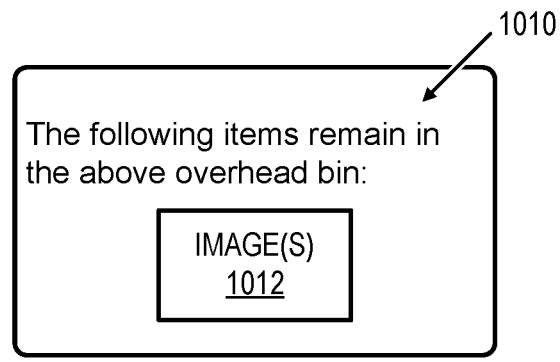

FIG. 10B depicts another example message 1010 that may be output to provide an indication to a passenger still located on-board an aircraft that a foreign object is currently present within an overhead bin. In this example, message 1010 identifies the stowage compartment as an overhead bin. Message 1010 may include one or more images 1012 that include a static image and/or video feed captured via a camera associated with the overhead bin. Message 1010 may be output by displaying the message including the one or more images 1012 via a display device or by audibly reading at least a portion of the message as computer-generated speech via an audio interface of an integrated entertainment system associated with the passenger's seat or the passenger's personal electronic device.

Figure 10C:
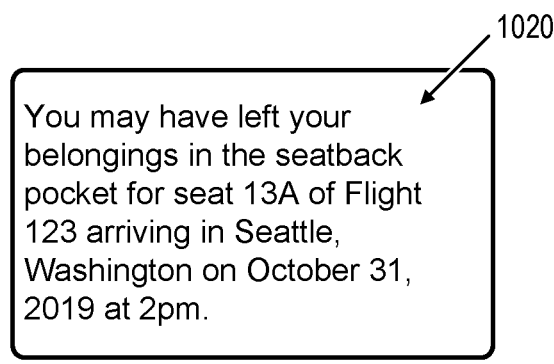

FIG. 10C depicts an example message 1020 that may be output to provide an indication that a foreign object was or is currently present within a stowage compartment of an aircraft following deboarding of passengers. Message 1000 identifies the type of stowage compartment (e.g., seatback pocket), a seat identifier (e.g., 13A), the flight (e.g., flight 123 arriving in the city of Seattle, Washington), and the date/time of the arrival (e.g., Oct. 31, 2019 at 2 pm).

Figure 10D:
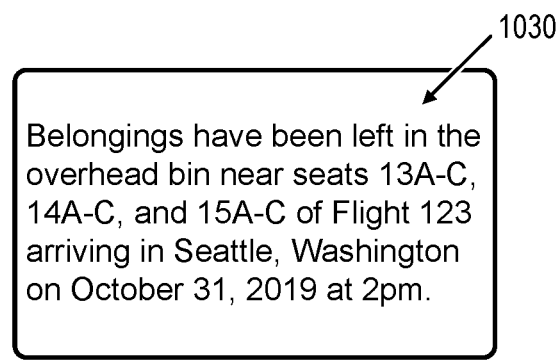

FIG. 10D depicts another example message 1030 that may be output to provide an indication that a foreign object was or is currently present within a stowage compartment of an aircraft following deboarding of passengers. Message 1030 identifies the type of stowage compartment (e.g., overhead bin), a seat identifier (e.g., 13A-C, 14A-C, and 15A-C), the flight (e.g., flight 123 arriving in the city of Seattle, Washington), and the date/time of the arrival (e.g., Oct. 31, 2019 at 2 pm). In at least some examples, message 1030 may additionally include the one or more images 1012 previously described with respect to FIG. 10B, thereby enabling the passenger to determine whether any of the objects belong to the passenger. Messages 1020 and 1030 may be output by displaying the message via a display device or by audibly reading the message as computer-generated speech via an audio interface of a client device, as examples.

While FIGS. 10A-10D are described with reference to passenger stowage compartments, the examples can similarly apply to stowage compartments intended for service personnel. For example, a flight crew can receive an indication that their personal belongs have been left within storage cabinets, overhead bins, or seatback pockets located within service personnel regions of the aircraft.

FIG. 11A depicts an example field of view 1100 of a camera of an imaging system positioned within a cargo hold of a vehicle, such as an aircraft. Field of view 1100 can correspond to an image captured by a camera of the imaging system. In this example, a foreign object 1110 (e.g., luggage) is present within the cargo hold of the vehicle and within the field of view of the imaging system.

FIG. 11B depicts an example field of view 1120 of the imaging system positioned within a cargo hold of a vehicle, such as an aircraft. Field of view 1120 can correspond to a baseline image captured by a camera of the imaging system. In this example, foreign objects including foreign object 1110 are not present within the cargo hold of the vehicle and within the field of view of the imaging system. The imaging system and vehicle of FIG. 11B can refer to the same imaging system and vehicle as FIG. 11A, or the vehicles and imaging systems of FIGS. 11A and 11B can be of the same model or class to enable comparison between their images as part of foreign object detection.

FIG. 11C depicts a simplified representation 1130 of a vehicle in the form of aircraft. Representation 1130 can take the form of a graphical representation that is output via a display device, as an example. The aircraft in this example includes four cargo holds or cargo hold regions represented schematically at 1132, 1134, 1136, and 1138. Each cargo hold or cargo hold region is imaged by an imaging system (including one or more cameras and in some examples one or more illumination sources) as represented schematically at 1142, 1144, 1146, and 1148. As an example, the cargo hold or cargo hold region represented schematically at 1132 can correspond to the cargo hold within field of view 1100 of FIG. 11A. Upon detection of a foreign object within cargo hold or cargo hold region 1132 via imaging system 1142, the cargo hold or cargo hold region 1132 can be graphically represented in a visually distinguishable manner from the other cargo holds or cargo hold regions of the aircraft for which foreign objects have not been detected as being present.

Figure 12:
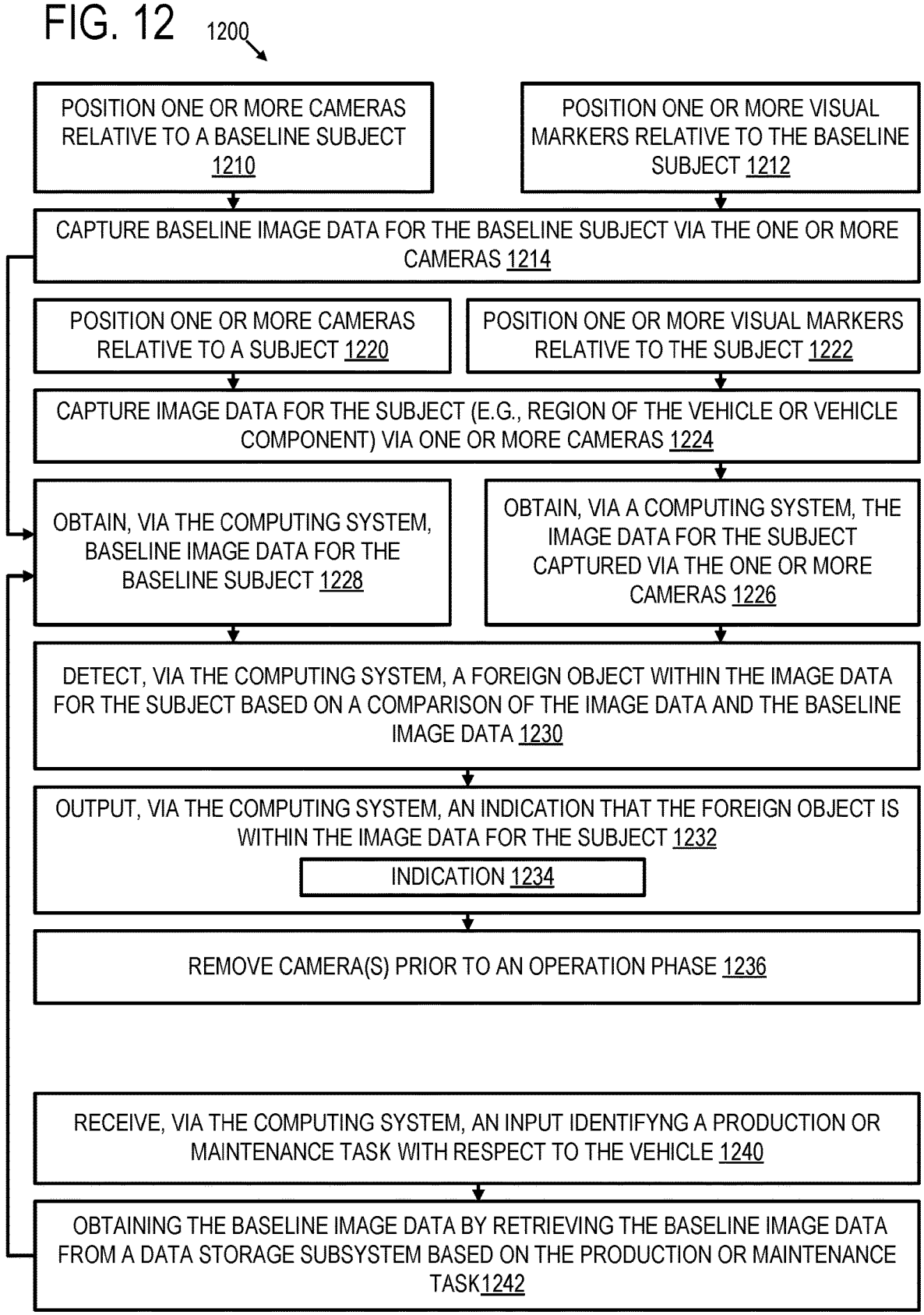
FIG. 12 is a flow diagram depicting an example method of foreign object detection using one or more cameras of an imaging system.

FIG. 12 is a flow diagram depicting an example method 1200 of foreign object detection using cameras of an imaging system. The imaging system described with reference to method 1200 can refer to any of the imaging systems described herein, including those associated with cargo holds, overhead bins, storage cabinets, vehicle components, or other suitable regions of a vehicle.

At 1210, the method can include positioning one or more cameras relative to a baseline subject. As an example, the baseline subject can be a stowage compartment, a region of a vehicle (e.g., an aircraft) or a vehicle component (e.g., aircraft component) for which foreign object detection is to be performed. As another example, the baseline subject can be a representative subject that is visually similar to the stowage compartment, region of the vehicle or vehicle component for which foreign object detection is to be performed. For example, the baseline subject can be another vehicle or vehicle component of the same model or class as the vehicle or vehicle component for which foreign object detection is to be performed.

In at least some examples, visual markers can be included within a field of view of the one or more cameras positioned at operation 1210. These visual markers can assist with identification of the baseline subject within baseline images captured by the one or more cameras positioned at operation 1210, identification of a positioning of the one or more cameras, and/or performance of computer vision applied to the baseline images. Examples of visual markers include QR codes, bar codes, or other visually distinguishable markers.

Where visual markers are to be included, the method at 1212 can include positioning one or more visual markers relative to the baseline subject. For example, the one or more visual markers can be positioned within the field of view of the one or more cameras. In at least some examples, the one or more visual markers can be positioned at predefined positionings relative to specified physical features of the baseline subject.

At 1214, the method can include capturing baseline image data for the baseline subject via the one or more cameras positioned at operation 1210. The baseline image data can include one or more baseline images of the region or component of the baseline subject (e.g., a vehicle such as an aircraft) captured by each camera in the absence of foreign objects. In at least some examples, a camera can capture a sequence of baseline images in the form of a video. Baseline images can be stored in a data storage subsystem of a computing system for subsequent reference or retrieval.

At 1220, the method can include positioning one or more cameras relative to a subject for which foreign object detection is to be performed, such as a region of a vehicle (e.g., an aircraft) or a vehicle component (e.g., aircraft component). The subject of operation 1220 can be the same as the baseline subject or another subject that is visually similar to the baseline subject (e.g., a vehicle of the same model or class).

In at least some examples, the method at 1222 can include positioning one or more visual markers relative to the subject for which foreign object detection is to be performed. For example, the one or more visual markers can be positioned within a field of view of the one or more cameras positioned at 1220. As previously described with reference to operation 1212, the one or more visual markers can be positioned at operation 1222 at predefined positionings relative to specified physical features of the subject.

At 1224, the method can include capturing image data for the subject via the one or more cameras positioned at operation 1220. The image data can include one or more images of the region or component of the subject (e.g., a vehicle such as an aircraft) captured by each camera. In at least some examples, a camera can capture a sequence of images in the form of a video. Images captured at operation 1224 can be stored in a data storage subsystem of a computing system for subsequent reference or retrieval.

In at least some examples, the positioning of the one or more cameras relative to the subject at 1220 can be identical or similar to the positioning of the one or more cameras relative to the baseline subject at 1210. By maintaining the same or similar positioning between or among cameras, computer-implemented comparisons between images captured at operations 1214 and 1224 can be more accurately or efficiently performed. However, in at least some examples, different positioning between operations 1210 and 1220 can be used.

Furthermore, in at least some examples, the cameras positioned at operation 1210 can be the same cameras or of the same model or class of cameras as the cameras positioned at operation 1220. By using the same or similar cameras, computer-implemented comparisons between images can be more accurately or efficiently performed. However, in at least some examples, different cameras between operations 1210 and 1220 can be used.

Furthermore, in at least some examples, the positioning of visual markers at operations 1212 and 1222 can be the same or similar positioning relative to their respective subjects. By maintaining the same or similar relative positioning among visual markers, computer-implemented comparisons between images captured at operations 1214 and 1224 can be more accurately or efficiently performed.

At 1226, the method can include obtaining, via a computing system, the image data for the subject (e.g., a region or component of a vehicle such as an aircraft) captured via the one or more cameras at operation 1224. As an example, the computing system can retrieve or reference the image data from a data storage subsystem.

At 1228, the method can include obtaining, via the computing system, the baseline image data for the baseline subject captured via the one or more cameras at operation 1214. As an example, the computing system can retrieve or reference the baseline image data from a data storage subsystem.

At 1230, the method can include detecting, via the computing system, a foreign object within the image data for the subject based on a comparison of the image data obtained at operation 1226 and the baseline image data obtained at operation 1228.

At 1232, the method can include outputting, via the computing system, an indication (1234) that the foreign object is within the image data for the subject. The indication output at 1232 can include providing an output to a user interface, user device, or storing the indication in a data storage subsystem, as examples.

At 1236, the method can include removing the one or more cameras from the vehicle prior to an operation phase of the vehicle. For example, as described with reference to FIG. 13, cameras 1316 and 1318 can be removed from aircraft 1300 prior to operation of the aircraft.

Figure 13:
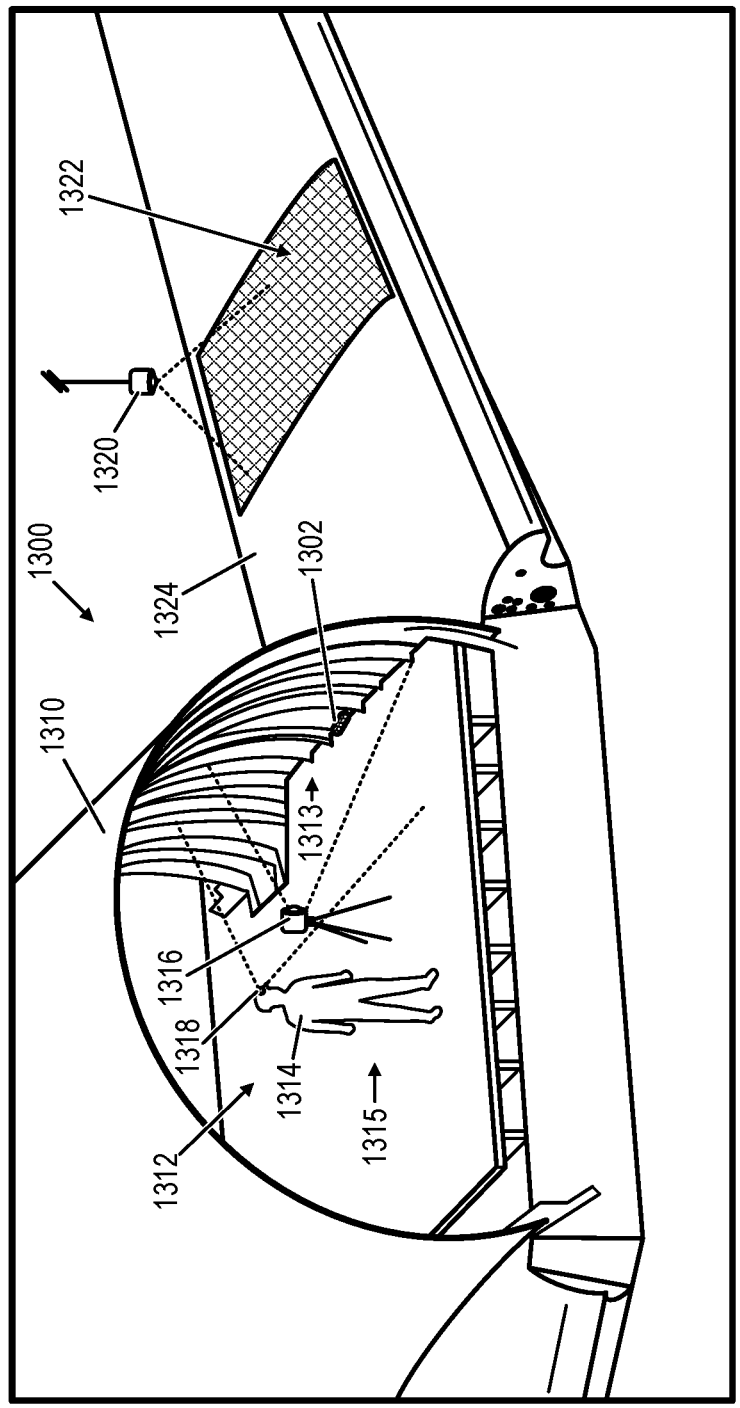
FIG. 13 depicts an example vehicle in the form of an aircraft being imaged by one or more imaging systems to detect foreign objects as part of a production phase or maintenance phase.
Figure 14:
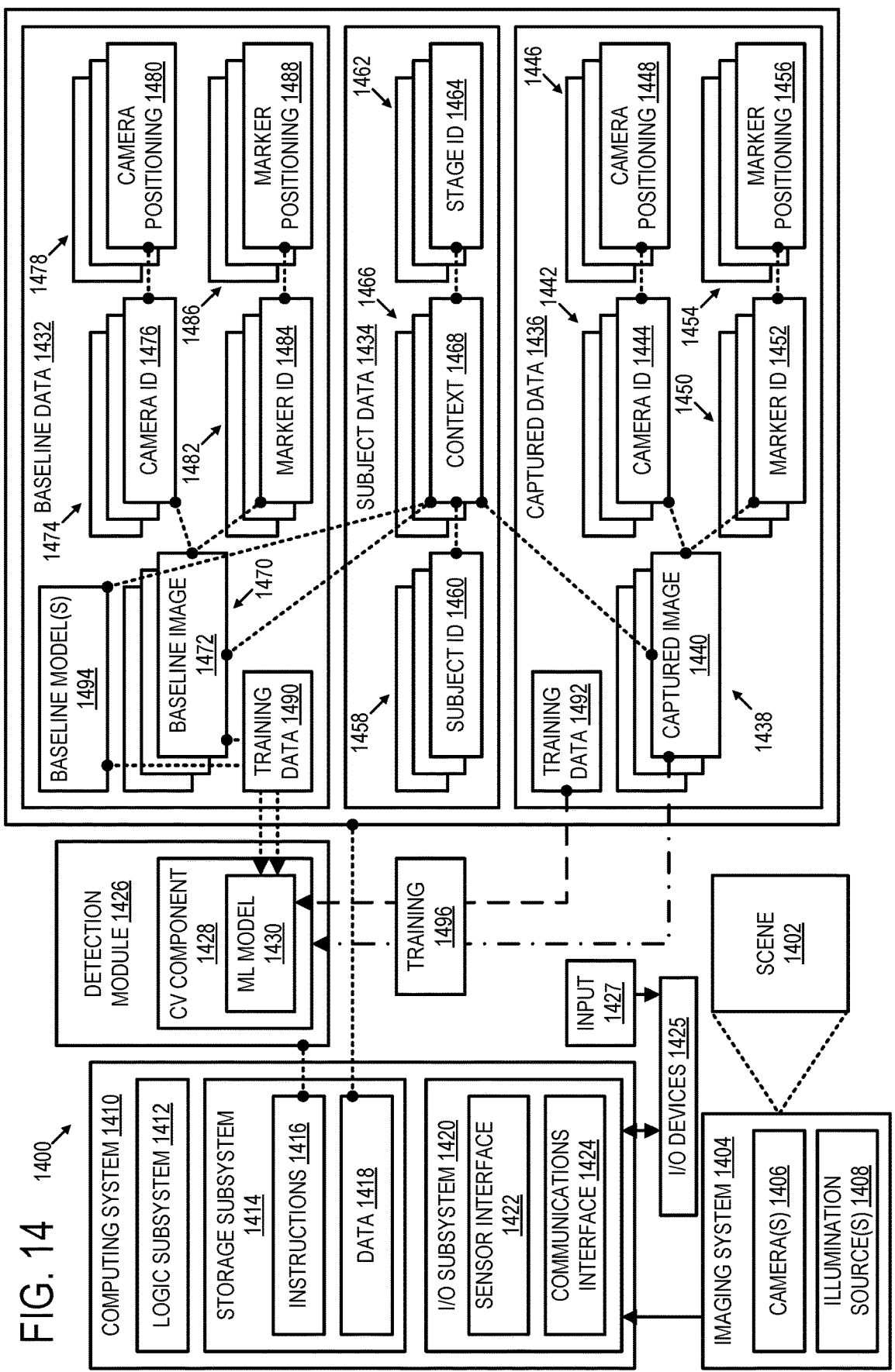
FIG. 14 depicts a schematic representation of an example detection system that supports visual detection of foreign objects

In at least some implementations, baseline conditions can be associated with production or maintenance tasks to be performed with respect to the vehicle (e.g., an aircraft). For example, at 1240, the method can include receiving, via the computing system, an input identifying a production or maintenance task with respect to the aircraft. At 1242, the method can include obtaining the baseline image data by retrieving the baseline image data from a data storage subsystem based on the production or maintenance task. FIGS. 13 and 14 describe additional aspects of foreign object detection for production and maintenance tasks.

FIG. 13 depicts an example vehicle in the form of an aircraft 1300 being imaged by one or more imaging systems to detect foreign objects as part of a production phase or a maintenance phase. In this example, aircraft 1300 includes a partially assembled fuselage 1310, an interior 1312 of which includes service personnel 1314 working on a production or maintenance task 1315.

An example of a portable imaging system 1316 including one or more cameras (and one or more illumination sources in some examples) has been temporarily positioned within interior 1312 of the fuselage to capture one or more images of a region 1313 of the aircraft or aircraft component. The region of the aircraft or the aircraft component imaged in this example can be inaccessible after the production or maintenance phase has concluded, making it difficult for the foreign object to be detected as part of the operation phase. In this example, a foreign object 1302 (e.g., a tool) is present within the one or more images captured by portable imaging system 1316. By detecting the foreign object, the foreign object can be removed, such as prior to conclusion of the production or maintenance phase, and prior to the operation phase. Imaging system 1316, in this example, can be removed from the aircraft prior to the operation phase following the production or maintenance phase.

Within the example of FIG. 13, another portable imaging system 1318 including one or more cameras (and one or more illumination sources in some examples) is used by service personnel 1314 to capture one or more images of a region of the aircraft or aircraft components. Foreign object 1302 can be similarly detected by use of portable imaging system 1318. Portable imaging system 1318 can take the form of a wearable imaging system (e.g., head, wrist, or body-mounted imaging system) or a handheld imaging system, as examples. Imaging system 1318 can be removed from the aircraft prior to an operation phase following the production or maintenance phase.

Additionally, within the example of FIG. 13, an imaging system 1320 including one or more cameras (and one or more illumination sources in some examples) is installed within a production or maintenance facility to capture one or more images of the aircraft or aircraft components. For example, one or more images of an exposed interior region 1322 of a component 1324 (e.g., wing) of aircraft 1300 can be captured by imaging system 1320. Foreign objects can be similarly detected by use of imaging system 1320.

FIG. 14 depicts a schematic representation of an example detection system 1400 that supports visual detection of foreign objects as part of the previously described operation phase 152, maintenance phase 153, and production phase 154 of FIG. 1B.

Detection system 1400 includes a computing system 1410 of one or more computing devices. Computing system 1410 can refer to computing system 201 of FIG. 2A, including one or more of on-board computing system 270, server system 204, client devices 206, etc. Accordingly, it will be understood that computing system 1410 can reside on-board or off-board a vehicle, or computing system 1410 can take the form of a distributed computing system that includes computing devices residing both on-board and off-board the vehicle.

Computing system 1410 includes a logic subsystem 1412 of one or more logic devices, and a storage subsystem 1414 of one or more storage devices having computer-executable instructions 1416 and other data 1418 stored thereon. Instructions 1416 are executable by logic subsystem 1412 to perform the various methods and operations described herein. Computing system 1410 further includes an input/output subsystem 1420 that includes a sensor interface 1422 and a communications interface 1424.

Detection system 1400 further includes an imaging system 1404 of one or more cameras 1406. Additionally, imaging system 1404 can include one or more illumination sources 1408, in at least some examples. Imaging system 1404 can capture images of a scene 1402, which can include a vehicle or vehicle components. Images captured by imaging system 1404 can be received by computing system 1410 via input/output subsystem 1420, such as via sensor interface 1422 or via communications interface 1424. Detection system 1400 further includes one or more input and/or output devices 1425, which can refer to client computing devices, graphical displays, user input devices, etc. As an example, an input 1427 (e.g., a user input or sensor input) can be received via one or more of devices 1425 identifying a particular a production task or a maintenance task with respect to a vehicle.

FIG. 14 depicts aspects of instructions 1416 and data 1418 in further detail. Instructions 1416 can include a detection module 1426 that includes a computer vision component 1428. In at least some examples, computer vision component 1428 can include a machine learning model 1430 that is trained based on baseline image data.

Data 1418 can include baseline data 1432, subject data 1434, and captured data 1436. Baseline data 1432 can include baseline image data 1470 representing one or more baseline images of vehicle(s) or vehicle components, of which baseline image 1472 is an example. As an example, baseline image data 1470 can refer to examples of baseline conditions 533, 534, and 535 of stowage compartments as previously described with reference to method 500. As another example, baseline image data 1470 can include baseline images of interior or exterior regions of a vehicle, as well as vehicle components to be assembled as part of production or maintenance of the vehicle.

Baseline image data 1470 can be associated with one or more camera identifiers 1474 of cameras that captured the baseline images, of which camera identifier 1476 associated with baseline image 1472 is an example. Within baseline data 1432, each of the one or more camera identifiers 1474 can be associated with camera positioning data 1478, of which camera positioning 1480 is an example. For example, camera identifier 1476 can be associated with camera positioning 1480. Camera positioning 1480 can refer to a positioning of the camera identified by camera identifier 1476 for the capture of baseline image 1472. For example, camera positioning 1480 can refer to a positioning of the camera in six degrees of freedom (6DOF—e.g., X, Y, Z positioning in a cartesian coordinate system, and roll, pitch, yaw in a rotational coordinate system) within a physical environment.

In at least some examples, a visual marker can be included within a frame of baseline image data 1470 that can be used to identify relative positioning of the camera and/or to identify a subject within an image. Baseline data 1432 can include one or more marker identifiers 1482 that identify respective visual markers, of which marker identifier 1484 is an example. Within baseline data 1432, each of the one or more marker identifiers 1484 can be associated with marker positioning data 1486, of which marker positioning 1488 is an example. For example, marker identifier 1484 can be associated with marker positioning 1488. Marker positioning 1488 can refer to a positioning of the maker identified by marker identifier 1484 within baseline image 1472 that is associated with the marker identifier. As an example, marker positioning 1488 can refer to a positioning of the marker in six degrees of freedom (6DOF—e.g., X, Y, Z positioning in a cartesian coordinate system, and roll, pitch, yaw in a rotational coordinate system) within a physical environment.

Baseline data 1432 can include one or more baseline models 1494. A baseline model can include a two-dimensional or three-dimensional representation of a particular subject, such as vehicle or vehicle component.

In at least some examples, baseline models 1494 and/or baseline image data 1470 can be used as training data 1490 to train 1496 machine learning model 1430. For example, baseline images within which foreign objects are not present can be labeled as not containing foreign objects within the training data. Following training, detecting foreign objects can be performed by executing the trained machine learning model with image data 1438 of captured images as an input.

Subject data 1434 can include one or more subject identifiers 1458 of which subject identifier 1460 is an example. Each of subject identifiers 1458 can identify a particular subject, such as a particular vehicle or particular vehicle component. Subject data 1434 can include one or more stage identifiers 1462 of which stage identifier 1464 is an example. Each of stage identifiers 1462 can identify a particular stage of production, maintenance, or operation phases. As an example, each stage identifier can refer to a task (e.g., task 1315 of FIG. 13) of a production phase or a maintenance phase. Stage identifier 1464, for example, can refer to a component replacement task of a maintenance phase with respect to a vehicle or vehicle component. As another example, stage identifier 1464 can refer to a component assembly or installation task of a production phase with respect to a vehicle or vehicle component.

In at least some examples, a particular subject identifier and a particular stage identifier can refer to a particular context of the subject. For example, subject data 1434 can include one or more contexts 1466 of which context 1468 is an example. Context 1468, in this example, refers to an association of subject identifier 1460 and stage identifier 1464.

The previously described baseline images 140 and baseline models 1494 of baseline data 1432 can be associated with a particular context within subject data 1434. Within the example of FIG. 14, context 1468 is associated with baseline image 1472 and/or baseline model 1494 within data 1418. In this example, associated baseline image 1472 captures the subject identified by subject identifier 1460 at the stage of production, maintenance or operation identified by stage identifier 1464, and/or the associated baseline model represents the subject identified by subject identifier 1460 at the stage identified by stage identifier 1464.

Captured data 1436 can refer to data that is captured for comparison to baseline data as part of detecting the presence of foreign objects. As example, captured data 1436 can include image data 1438 one or more captured images of a vehicle or a vehicle component of which captured image 1440 is an example. Within the example of FIG. 14, the one or more of captured images of image data 1438 have been captured by one or more cameras 1406 of imaging system 1404, and stored in data 1418 by computing system 1410.

Captured image data 1438 can be associated with particular camera identifiers 1442, camera positioning data 1446, marker identifiers 1450, and marker positioning data 1454, as previously described with reference to baseline data 1432. As an example, captured image 1440 is associated with camera identifier 1444 having camera positioning 1448. Additionally, in this example, captured image 1440 is associated with marker identifier 1452 and marker positioning 1456. For example, scene 1402 captured by one or more cameras 1406 as captured image 1440 can include the marker identified by marker identifier 1452.

Captured image data 1438 can be associated with a particular context within subject data 1434. Within the example of FIG. 14, context 1468 is associated with captured image 1440. In this example, captured image 1440 captures the subject identified by subject identifier 1460 at the stage of production, maintenance or operation identified by stage identifier 1464. For example, scene 1402 captured by one or more cameras 1406 as captured image 1440 can include the subject identified by subject identifier 1460 at the stage identified by stage identifier 1464.

In at least some examples, captured image data 1438 can be used as training data 1492 to train machine learning model 1430. For example, captured images that are labeled as containing a detected foreign object and/or captured images that are labeled as not containing a detected foreign object can be used as training data 1492 to improve detection performance of the machine learning model. Labeling of captured images of image data 1438 can be performed responsive to supervised confirmation by human users, in at least some examples.

In some at least some implementations, the methods and operations described herein may be tied to a computing system of one or more computing devices. In particular, such methods and processes may be implemented as a computer-application program or service, an application-programming interface (API), a library, and/or other computer-program product.

FIGS. 2A and 14 schematically show non-limiting examples of a computing system of one or more computing devices. For example, computing system 201 of FIG. 2A includes some or all of on-board computing system 270, server system 204, client devices 206, etc. as examples of devices that can enact one or more of the methods and operations described herein. A computing system of may take the form of one or more personal computers, server computers, tablet computers, home-entertainment computers, network computing devices, gaming devices, mobile computing devices, mobile communication devices (e.g., smart phone), and/or other computing devices. While components of a computing system are described in further detail below, it will be understood that computing system components such as server system 204, client devices 206, and other suitable computing devices also include a logic subsystem, a storage subsystem, an input/output subsystem, and other suitable components.

The computing systems of the present disclosure are depicted in simplified form. A logic subsystem, such as example logic subsystem 271 or logic subsystem 1412, include one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the condition of one or more components, achieve a technical effect, or otherwise arrive at a desired result.

A logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

A storage subsystem, such as example storage subsystem 272 or storage subsystem 1414, include one or more physical devices configured to hold instructions executable by the logic subsystem to implement the methods and operations described herein. When such methods and operations are implemented, the condition of the storage subsystem may be transformed—e.g., to hold different data. The storage subsystem may include removable and/or built-in devices. The storage subsystem may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem may include volatile, nonvolatile, dynamic, static, read/write, read-only, random-access, sequential-access, location-addressable, file-addressable, and/or content-addressable devices. It will be appreciated that the storage subsystem includes one or more physical devices. However, aspects of the instructions described herein alternatively may be propagated by a communication medium (e.g., an electromagnetic signal, an optical signal, etc.) that is not held by a physical device for a finite duration.

Aspects of a logic subsystem and a storage subsystem of a computing device or computing system may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of the computing system implemented to perform a particular function. In some cases, a module, program, or engine may be instantiated via the logic subsystem executing instructions held by the storage subsystem. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service" may be used to refer to an application program executable across multiple user sessions. A service may be available to one or more system components, programs, and/or other services. In some implementations, a service may run on one or more server-computing devices.

When included, a display device (e.g., 232, 234, etc.) may be used to present a visual representation of data held by the storage subsystem. This visual representation may take the form of a graphical user interface (GUI). As the herein described methods and operations change the data held by the storage subsystem, and thus transform the condition of the storage subsystem, the condition of the display device may likewise be transformed to visually represent changes in the underlying data. Display devices may be combined with the logic subsystem and/or the storage subsystem in a shared enclosure, or such display devices may be peripheral display devices.

An input/output subsystem, such as example input/output subsystems 275 or 1420, may comprise or interface with one or more user-input devices such as a keyboard, mouse, touch screen, or handheld controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

A communications interface, such as example communications interface 277 of on-board computing system 270, may be configured to communicatively couple the computing system with one or more other computing devices or computing systems. The communications interface may include wired and/or wireless communication devices compatible with one or more different communication protocols. The communications interface may be configured for communication via a wireless telephone network, or a wired or wireless local- or wide-area network, as examples. In some examples, the communications interface may allow the computing system to send and/or receive messages to and/or from other devices via a network such as the Internet.

Examples of the subject matter of the present disclosure are described in the following enumerated paragraphs.

A1. A method performed by a computing system with respect to an aircraft passenger cabin containing a plurality of stowage compartments, the method comprising: receiving sensor data captured via a sensor subsystem that includes a sensor associated with each of the plurality of stowage compartments; identifying, for each of the plurality of stowage compartments, a baseline condition in which foreign objects are absent from the stowage compartment; detecting a foreign object within a stowage compartment based on the received sensor data for the stowage compartment and the baseline condition identified for the stowage compartment; conducting an audit of the plurality of stowage compartments for contents; and based on the audit, outputting an indication that the foreign object is within the stowage compartment, the indication identifying the stowage compartment among the plurality of stowage compartments.

A2. The method of paragraph A1, wherein the plurality of stowage compartments include a plurality of overhead bins or a plurality of seatback pockets, and wherein: for the plurality of overhead bins, the one or more sensors associated with each of the plurality of overhead bins include an optical sensor, or for the plurality of seatback pockets, the one or more sensors associated with each of the plurality of seatback pockets include: a strain gauge that outputs an indication of strain within an outer wall of the seatback pocket opposite its seatback, or a force sensor that outputs an indication of a weight and/or a torque applied to the seatback pocket, or an angle sensor that outputs an indication of an angle between an outer wall of the seatback pocket and its seatback.

A3. The method of paragraph A2, wherein the plurality of stowage compartments include the plurality of overhead bins; and wherein the method further comprises: detecting a fire or smoke condition within one of the plurality of overhead bins via the optical sensor associated with the overhead bin; and outputting an indication of the fire or smoke condition.

A4. The method of paragraph A2, wherein the plurality of stowage compartments include the plurality of seatback pockets; and wherein the method further comprises: aggregating the sensor data received over time to obtain an aggregate value for each of the plurality of seatback pockets; detecting an aggregate fatigue condition for one of the plurality of seatback pockets based on the aggregate value for the seatback pocket; and outputting an indication of the aggregate fatigue condition for the seatback pocket that identifies the seatback pocket among the plurality of seatback pockets.

A5. The method of any of paragraphs A1-A4, further comprising: detecting a trigger condition; and responsive to the trigger condition, conducting the audit of the plurality of stowage compartments for contents.

A6. The method of paragraph A5, wherein the trigger condition is detected responsive to receiving a user input via a service personnel interface or responsive to a sensor input from a sensor located on-board the aircraft.

A7. The method of any of paragraphs A1-A6, wherein the baseline condition is detected responsive to receiving a user input via a service personnel interface or responsive to a sensor input from a sensor located on-board the aircraft.

A8. The method of any of paragraphs A1-A7, wherein outputting the indication that the foreign object is present within the stowage compartment includes outputting a visual indication via a display device or an illumination unit integrated with the aircraft.

A9. The method of paragraph A8, wherein the display device or the illumination unit is one of a plurality of available output devices integrated with the aircraft; and wherein the method further includes selecting the device or the illumination unit from among the plurality of available output devices for the stowage compartment.

A10. The method of any of paragraphs A1-A9, wherein outputting the indication that the foreign object is present within the stowage compartment includes transmitting an electronic message identifying the stowage compartment to a target recipient address over a communications network; and wherein the method further comprises, identifying the target recipient address from a database that associates the target recipient address with the stowage compartment for aircraft operations occurring between identifying the baseline condition for the stowage compartment and conducting the audit.

A11. The method of any of paragraphs A1-A10, wherein the baseline condition for a stowage compartment includes baseline sensor data received via the one or more sensors associated with the stowage compartment; and wherein the foreign object is identified as being present within the stowage compartment based on a comparison of the baseline sensor data with the sensor data received from the sensor associated with the stowage compartment while the audit is conducted.

B1. A detection system for monitoring an aircraft passenger cabin containing a plurality of stowage compartments, the detection system comprising: a sensor subsystem including a sensor associated with each of the plurality of stowage compartments; a logic subsystem interfacing with the sensor subsystem; and a storage subsystem having instructions stored thereon executable by the logic subsystem to: receive sensor data captured via the sensor subsystem; identify, for each of the plurality of stowage compartments, a baseline condition in which foreign objects are absent from the stowage compartment; detect a foreign object within a stowage compartment based on the sensor data captured by the sensor associated with the stowage compartment and the baseline condition identified for the stowage compartment; conduct an audit of the plurality of stowage compartments for contents; and based on the audit, output an indication that the foreign object is within the stowage compartment, the indication identifying the stowage compartment among the plurality of stowage compartments.

B2. The detection system of paragraph B1, wherein the plurality of stowage compartments include a plurality of overhead bins or a plurality of seatback pockets, and wherein: for the plurality of overhead bins, the one or more sensors associated with each of the plurality of overhead bins include an optical sensor, or for the plurality of seatback pockets, the one or more sensors associated with each of the plurality of seatback pockets include: a strain gauge that outputs an indication of strain within an outer wall of the seatback pocket opposite its seatback, a force sensor that outputs an indication of a weight and/or a torque applied to the seatback pocket, or an angle sensor that outputs an indication of an angle between an outer wall of the seatback pocket and its seatback.

B3. The detection system of paragraph B2, wherein the plurality of stowage compartments include the plurality of overhead bins; and wherein the instructions are further executable by the logic subsystem to: detect a fire or smoke condition within one of the plurality of overhead bins via the optical sensor associated with the overhead bin; and output an indication of the fire or smoke condition.

B4. The detection system of paragraph B2, wherein the plurality of stowage compartments include the plurality of seatback pockets; and wherein the instructions are further executable by the logic subsystem to: aggregate the sensor data received over time to obtain an aggregate value for each of the plurality of seatback pockets; detect an aggregate fatigue condition for one of the plurality of seatback pockets based on the aggregate value for the seatback pocket; and output an indication of the aggregate fatigue condition for the seatback pocket that identifies the seatback pocket among the plurality of seatback pockets.

B5. The detection system of any of paragraphs B1-B4, wherein the indication that the foreign object is within the stowage compartment is output as a visual indication via a display device or an illumination unit integrated with the aircraft.

B6. The detection system of any paragraphs B1-B5, wherein the indication that the foreign object is within the stowage compartment is output by transmitting, via a communications interface of the detection system, an electronic message identifying the stowage compartment to a target recipient address over a communications network; and wherein the instructions are further executable by the logic subsystem to identify the target recipient address from a database that associates the target recipient address with the stowage compartment for aircraft operations occurring between identification of the baseline condition for the stowage compartment and conducting the audit.

B7. The detection system of any paragraphs B1-B6, wherein the baseline condition includes sensor data received via the one or more sensors associated with the stowage compartment in which foreign objects are absent from the stowage compartment; and wherein the foreign object is identified within the stowage compartment based on a comparison of the baseline sensor data received for the baseline condition to the sensor data received by the one or more sensors associated with the stowage compartment while the audit is conducted.

B8. The detection system of any of paragraphs B1-B7, wherein the baseline condition is identified at a first time responsive to receiving a first user input via a service personnel interface or responsive to a sensor input from a sensor located on-board the aircraft; and wherein the audit is conducted at a second time occurring after the first time responsive to receiving a second user input via a service personnel interface or responsive to a sensor input from a sensor located on-board the aircraft.

C1. A passenger aircraft, comprising: a passenger cabin that includes a plurality of passenger seats and a plurality of stowage compartments, the plurality of stowage compartments further including a plurality of overhead bins located above the plurality of passenger seats or a plurality of seatback pockets located upon the plurality of passenger seats; a sensor subsystem including a sensor associated with each of the plurality of stowage compartments; a computing system configured to: receive sensor data captured via the sensor subsystem; identify, for each of the plurality of stowage compartments, a baseline condition in which foreign objects are absent from the stowage compartment; detect a foreign object within a stowage compartment of the plurality of stowage compartments based on the sensor data associated with the stowage compartment and the baseline condition identified for the stowage compartment; and output an indication that the foreign object is present within the stowage compartment, the indication identifying the stowage compartment among the plurality of stowage compartments.

D1. A method performed by a computing system with respect to an aircraft, the method comprising: receiving sensor data captured via a sensor subsystem that includes a sensor associated with a stowage compartment of the aircraft; identifying, for the stowage compartment, a baseline condition in which foreign objects are absent from the stowage compartment; detecting a foreign object within the stowage compartment based on the received sensor data for the stowage compartment and the baseline condition identified for the stowage compartment; and outputting an indication that the foreign object is within the stowage compartment.

D2. The method of paragraph D1, wherein the stowage compartment is a service personnel-designated stowage compartment; and wherein the sensor includes an optical sensor, a weight sensor, or a pressure sensor.

D3. The method of paragraph D1, wherein the stowage compartment is a cargo hold; and wherein the sensor includes an optical sensor.

D4. The method of paragraph D1, wherein the stowage compartment is one of a plurality of overhead bins; and wherein the sensor includes an optical sensor.

D5. The method of any of paragraphs D1-D4, further comprising: detecting a trigger condition; responsive to the trigger condition, conducting an audit of the stowage compartment for contents; wherein outputting the indication that the foreign object is within the stowage compartment is based on the audit; and wherein the indication identifies the stowage compartment among a plurality of stowage compartments of the aircraft.

D6. The method of paragraph D5, wherein the trigger condition is detected responsive to receiving a user input via a service personnel interface.

D7. The method of paragraph D5, wherein the trigger condition is detected responsive to a sensor input from another sensor located on-board the aircraft.

D8. The method of paragraph D7, wherein said another sensor is a door sensor indicating an open or closed state of a door of the aircraft.

D9. The method of any of paragraphs D1-D8, wherein outputting the indication that the foreign object is present within the stowage compartment includes outputting a visual indication via a display device or an illumination unit integrated with the aircraft.

D10. The method of paragraph D9, wherein the display device or the illumination unit is one of a plurality of available output devices integrated with the aircraft; and wherein the method further includes selecting the display device or the illumination unit from among the plurality of available output devices for the stowage compartment.

D11. The method of any of paragraphs D1-D10, wherein outputting the indication that the foreign object is present within the stowage compartment includes transmitting an electronic message identifying the stowage compartment to a target recipient address over a communications network; and wherein the method further comprises, identifying the target recipient address from a database that associates the target recipient address with the stowage compartment.

D12. The method of any of paragraphs D1-D11, wherein the baseline condition for a stowage compartment includes baseline sensor data received via the sensor associated with the stowage compartment.

E1. A method, comprising: obtaining, via a computing system, image data of a region of an aircraft or an aircraft component captured via one or more cameras; obtaining, via the computing system, baseline image data for the region of the aircraft or aircraft component; detecting, via the computing system, a foreign object within the region of the aircraft or aircraft component based on a comparison of the image data and the baseline image data; and outputting, via the computing system, an indication that the foreign object is within the region of the aircraft or aircraft component.

E2. The method of paragraph E1, further comprising: during a maintenance phase or a production phase of the aircraft: positioning the one or more cameras on-board the aircraft to capture the region of the aircraft or aircraft component; and removing the one or more cameras from the aircraft prior to an operation phase of the aircraft.

E3. The method of any of paragraphs E1-E2, further comprising: receiving, via the computing system, an input identifying a production or maintenance task with respect to the aircraft; and obtaining the baseline image data by retrieving the baseline image data from a data storage subsystem based on the production or maintenance task.

E4. The method of any of paragraphs E1-E3, wherein the baseline image data includes one or more baseline images of another aircraft.

E5. The method of any of paragraphs E1-E4, wherein the baseline image data includes one or more baseline images of the region of the aircraft or aircraft component captured by one or more cameras before the one or more images were captured.

E6. The method of any of paragraphs E1-E3, wherein the baseline image data includes a virtual model of the region of the aircraft or aircraft component, or one or more images of the virtual model of the region of the aircraft or aircraft component.

E7. The method of any of paragraphs E1-E6, further comprising: training a machine learning model of the computing system using the baseline image data to obtain a trained machine learning model; and wherein detecting the foreign object is performed by executing the trained machine learning model with the image data as an input.

F1. A computing system, comprising: a logic subsystem; and a data storage subsystem having instructions stored thereon executable by the logic subsystem to: obtain image data of a region of an aircraft or an aircraft component captured via one or more cameras; obtain baseline image data for the region of the aircraft or aircraft component; detect a foreign object within the region of the aircraft or aircraft component based on a comparison of the image data and the baseline image data; and output an indication that the foreign object is within the region of the aircraft or aircraft component.

G1. An aircraft, comprising: a plurality of stowage compartments; a sensor subsystem including a sensor associated with each of the plurality of stowage compartments; a computing system configured to perform any of the methods of paragraphs A1-A11, D1-D12, and E1-E7.

It will be understood that the configurations and/or approaches described herein are exemplary in nature, and that these specific embodiments or examples are not to be considered in a limiting sense, because numerous variations are possible. The specific methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system with respect to an aircraft, the method comprising:
   receiving sensor data captured via a sensor subsystem that includes a sensor associated with a stowage compartment of the aircraft;
   identifying, for the stowage compartment, a baseline condition in which foreign objects are absent from the stowage compartment responsive to a user input or a sensor input received via an interface of the aircraft;
   detecting whether a foreign object is present within the stowage compartment based on the received sensor data for the stowage compartment and the baseline condition identified for the stowage compartment; and
   outputting an indication of whether the foreign object is present within the stowage compartment.

2. The method of claim 1, wherein the stowage compartment is a service personnel-designated stowage compartment; and
   wherein the sensor includes an optical sensor, a weight sensor, or a pressure sensor.

3. The method of claim 1, wherein the stowage compartment is a cargo hold; and
   wherein the sensor includes an optical sensor.

4. The method of claim 1, wherein the stowage compartment is one of a plurality of overhead bins; and
   wherein the sensor includes an optical sensor.

5. The method of claim 1, further comprising:
   detecting a trigger condition;
   responsive to the trigger condition, conducting an audit of the stowage compartment for contents;
   wherein outputting the indication whether the foreign object is present within the stowage compartment is responsive to the audit; and
   wherein the indication identifies the stowage compartment among a plurality of stowage compartments of the aircraft.

6. The method of claim 5, wherein the trigger condition is detected responsive to receiving another user input via a service personnel interface.

7. The method of claim 5, wherein the trigger condition is detected responsive to another sensor input from another sensor located on-board the aircraft.

8. The method of claim 7, wherein said another sensor is a door sensor indicating an open or closed state of a door of the aircraft.

9. The method of claim 1, wherein outputting the indication whether the foreign object is present within the stowage compartment includes outputting a visual indication via a display device or an illumination unit integrated with the aircraft.

10. The method of claim 9, wherein the display device or the illumination unit is one of a plurality of available output devices integrated with the aircraft; and
    wherein the method further includes selecting the display device or the illumination unit from among the plurality of available output devices for the stowage compartment.

11. The method of claim 1, wherein outputting the indication whether the foreign object is present within the stowage compartment includes transmitting an electronic message identifying the stowage compartment to a target recipient address over a communications network; and
    wherein the method further comprises, identifying the target recipient address from a database that associates the target recipient address with the stowage compartment.

12. The method of claim 1, wherein the baseline condition for the stowage compartment includes baseline sensor data received via the sensor associated with the stowage compartment.

13. The method of claim 1, wherein the baseline condition is identified responsive to the sensor input received via the interface of the aircraft from the sensor associated with the stowage compartment; and
    wherein the sensor associated with the stowage compartment is integrated with the aircraft.

14. The method of claim 1, wherein the baseline condition is identified responsive to the sensor input received via the interface of the aircraft from another sensor that is integrated with the aircraft.

15. The method of claim 1, wherein the baseline condition is identified responsive to the user input received via the interface of the aircraft that includes a service interface integrated with the aircraft.

16. A method performed by a computing system with respect to an aircraft, the method comprising:
    receiving sensor data captured via a sensor subsystem that includes a sensor associated with a stowage compartment of the aircraft, wherein the sensor includes an optical sensor;
    identifying, for the stowage compartment, a baseline condition in which foreign objects are absent from the stowage compartment;
    responsive to a change in lighting conditions within the stowage compartment detected via the optical sensor, conducting an audit of the stowage compartment;
    detecting whether a foreign object is present within the stowage compartment based on the received sensor data for the stowage compartment and the baseline condition identified for the stowage compartment; and
    responsive to the audit, outputting an indication of whether the foreign object is present within the stowage compartment.

17. The method of claim 16, wherein the stowage compartment is a service personnel-designated stowage compartment or a passenger-designated stowage compartment.

18. The method of claim 16, wherein the stowage compartment is a cargo hold.

19. The method of claim 16, wherein the baseline condition is identified responsive to a user input or a sensor input received via an interface of the aircraft.

20. A computing system, comprising:
a logic subsystem;
a data storage subsystem having instructions stored thereon executable by the logic subsystem to:
- receive sensor data captured via a sensor subsystem that includes a sensor associated with a stowage compartment of an aircraft;
- identify, for the stowage compartment, a baseline condition in which foreign objects are absent from the stowage compartment responsive to a user input or a sensor input received via an interface of the aircraft;
- detect whether a foreign object is present within the stowage compartment based on the received sensor data for the stowage compartment and the baseline condition identified for the stowage compartment; and
- output an indication of whether the foreign object is present within the stowage compartment.

\* \* \* \* \*